United States Patent
Kishikawa et al.

(10) Patent No.: US 11,425,128 B2
(45) Date of Patent: *Aug. 23, 2022

(54) UNAUTHORIZED CONTROL SUPPRESSION METHOD, UNAUTHORIZED CONTROL SUPPRESSION DEVICE, AND ONBOARD NETWORK SYSTEM

(71) Applicant: PANASONIC INTELLECTUAL PROPERTY CORPORATION OF AMERICA, Torrance, CA (US)

(72) Inventors: Takeshi Kishikawa, Osaka (JP); Manabu Maeda, Osaka (JP); Tohru Wakabayashi, Hyogo (JP); Toshihisa Nakano, Osaka (JP); Hideki Matsushima, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/039,107

(22) Filed: Sep. 30, 2020

(65) Prior Publication Data

US 2021/0014230 A1    Jan. 14, 2021

Related U.S. Application Data

(63) Continuation of application No. 16/031,079, filed on Jul. 10, 2018, now Pat. No. 10,834,083, which is a
(Continued)

(30) Foreign Application Priority Data

Jul. 5, 2016 (JP) .............................. JP2016-133760
Apr. 13, 2017 (JP) .............................. JP2017-080059

(51) Int. Cl.
*H04L 9/40* (2022.01)
*B60R 16/023* (2006.01)
(Continued)

(52) U.S. Cl.
CPC .......... *H04L 63/10* (2013.01); *B60R 16/0231* (2013.01); *H04L 12/40* (2013.01);
(Continued)

(58) Field of Classification Search
CPC ........................... H04L 63/10; H04L 63/1425
See application file for complete search history.

(56) References Cited

U.S. PATENT DOCUMENTS 10,834,083 B2 * 11/2020 Kishikawa ........ H04L 12/40104
2001/0015975 A1 * 8/2001 Kikuchi .............. H04L 12/1439
370/389
(Continued)

FOREIGN PATENT DOCUMENTS

CN   103999410 A    8/2014
JP   2013-098719    5/2013
(Continued)

OTHER PUBLICATIONS

English Translation of Chinese Search Report dated Oct. 22, 2020 for the related Chinese Patent Application No. 201780003700.8.
(Continued)

*Primary Examiner* — Ponnoreay Pich
(74) *Attorney, Agent, or Firm* — Greenblum & Bernstein, P.L.C.

(57) ABSTRACT

A method for use in a network system is provided. The network system includes a plurality of electronic controllers that transmits and receives, via a network, a plurality of frames. The plurality of frames includes at least one control frame that instructs predetermined control to an object of control. The method receives, sequentially, the plurality of
(Continued)

frames from the network, and determines whether the predetermined control, instructed by the control frame received in the receiving, is to be suppressed, based on a set of frames received in the receiving. The set of frames is received in the receiving within a predetermined period preceding a time of reception of the control frame.

18 Claims, 20 Drawing Sheets

Related U.S. Application Data continuation of application No. PCT/JP2017/023470, filed on Jun. 27, 2017.

(51) Int. Cl.
  *H04L 12/40* (2006.01)
  *H04L 67/125* (2022.01)
  *H04L 67/12* (2022.01)

(52) U.S. Cl.
  CPC .... *H04L 12/40104* (2013.01); *H04L 63/1425* (2013.01); *H04L 67/12* (2013.01); *H04L 67/125* (2013.01); *H04L 2012/40215* (2013.01); *H04L 2012/40273* (2013.01)

(56) References Cited

U.S. PATENT DOCUMENTS

| | | | |
|---|---|---|---|
| 2004/0117478 A1* | 6/2004 | Triulzi | H04L 63/1425 709/224 |
| 2008/0186870 A1* | 8/2008 | Butts | H04L 43/0847 370/252 |
| 2013/0326255 A1* | 12/2013 | Kodama | G06F 1/32 713/323 |
| 2014/0310530 A1 | 10/2014 | Oguma et al. | |
| 2014/0328352 A1* | 11/2014 | Mabuchi | H04L 12/4035 370/451 |
| 2015/0358351 A1* | 12/2015 | Otsuka | H04L 12/4625 726/23 |
| 2018/0316680 A1* | 11/2018 | Kishikawa | H04L 12/40104 |
| 2019/0007234 A1* | 1/2019 | Takada | H04L 12/40 |

FOREIGN PATENT DOCUMENTS

| | | |
|---|---|---|
| JP | 2014-146868 | 8/2014 |
| WO | 2013/094072 | 6/2013 |

OTHER PUBLICATIONS

International Search Report of PCT application No. PCT/JP2017/023470 dated Sep. 19, 2017.

Translation of PCT Written Opinion of the International Searching Authority for International Application No. PCT/JP2017/023470, 4 pages. (Year: 2017).

The Extended European Search Report from the European Patent Office (EPO) dated Mar. 18, 2019 for the European Patent Application No. 17824058.6.

* cited by examiner

FIG. 5

| ID | NEWEST | | ONE TIME BACK | | TWO TIMES BACK | | THREE TIMES BACK | |
|---|---|---|---|---|---|---|---|---|
| | TIME | VALUE | TIME | VALUE | TIME | VALUE | TIME | VALUE |
| 0x100 (VEHICLE SPEED) | 110 (ms) | 42.1 (km/h) | 61 (ms) | 0 (km/h) | 60 (ms) | 42.0 (km/h) | 10 (ms) | 42.0 (km/h) |
| 0x300 (GEARSHIFT POSITION) | 100 (ms) | DRIVE | 50 (ms) | DRIVE | | | | |

FIG. 6

| ID | COUNTERFEIT FLAG |
|---|---|
| 0x100 (VEHICLE SPEED) | 1 |
| 0x300 (GEARSHIFT POSITION) | 0 |

| RULE NO. | OBJECT OF FUNCTION RESTRICTION | CONDITIONS OF VEHICLE STATE |
|---|---|---|
| 1 | CONTROL FLAG OF 0x200 (STEERING WHEEL CONTROL INSTRUCTION) IS 1 | COUNTERFEIT FLAG OF ID 0x100 (VEHICLE SPEED) IS 1 |
| 2 | CONTROL FLAG OF 0x200 (STEERING WHEEL CONTROL INSTRUCTION) IS 1 | COUNTERFEIT FLAG OF ID 0x300 (GEARSHIFT POSITION) IS 1 |

FIG. 9A

| ID | DLC | DATA FIELD |
|---|---|---|
| 0x100 | 2 | 0x01 0xA5 (42.1) |

FIG. 9B

| ID | DLC | DATA FIELD |
|---|---|---|
| 0x200 | 4 | 0x01 0x00 0x00 0x30 (CONTROL 48 DEGREES TO THE RIGHT) |

FIG. 9C

| ID | DLC | DATA FIELD |
|---|---|---|
| 0x300 | 1 | 0x01 (REVERSE) |

FIG. 15

| ID | NEWEST | | ONE TIME BACK | | TWO TIMES BACK | |
|---|---|---|---|---|---|---|
| | TIME | VALUE | TIME | VALUE | TIME | VALUE |
| 0x100 (VEHICLE SPEED) | 211 (ms) | 0.0 (km/h) | 210 (ms) | 42.1 (km/h) | 160 (ms) | 42.0 (km/h) |
| 0x300 (GEARSHIFT POSITION) | 201 (ms) | REVERSE | 200 | DRIVE | 150 | DRIVE |

FIG. 16

| RULE NO. | OBJECT OF FUNCTION RESTRICTION | CONDITIONS OF VEHICLE STATE CONTINUATION TIME |
|---|---|---|
| 1 | CONTROL FLAG OF 0x200 (STEERING WHEEL CONTROL INSTRUCTION) IS 1 | CONTINUATION TIME OF VEHICLE SPEED (0x100) BEING 10 km/h OR LOWER IS 60 ms OR LESS |
| 2 | CONTROL FLAG OF 0x200 (STEERING WHEEL CONTROL INSTRUCTION) IS 1 | CONTINUATION TIME OF GEARSHIFT POSITION (0x300) BEING REVERSE IS 60 ms OR LESS |

| ID | DLC | DATA FIELD |
|---|---|---|
| 0x400 | 3 | 0x01 0x00 0x50 (CRUISE CONTROL ON, ACCELERATION OF 0.8 m/s$^2$) |

FIG. 23

| ID | NEWEST | | ONE TIME BACK | | TWO TIMES BACK | | THREE TIMES BACK | |
|---|---|---|---|---|---|---|---|---|
| | TIME | VALUE | TIME | VALUE | TIME | VALUE | TIME | VALUE |
| 0x400 (CRUISE CONTROL) | 301 (ms) | 1 (CONTROLLED) | 300 (ms) | 0 (NOT CONTROLLED) | 221 (ms) | 1 (CONTROLLED) | 220 (ms) | 0 (NOT CONTROLLED) |

FIG. 24

| RULE NO. | OBJECT OF FUNCTION RESTRICTION | CONTROL FUNCTION | CONDITIONS OF VEHICLE STATE |
|---|---|---|---|
| 1 | 0x400 (CRUISE CONTROL) | CONTROL | INCONSISTENCY CONTINUATION TIME IS 500 ms OR MORE |

FIG. 25

| ID | INCONSISTENCY CONTINUATION TIME | DURING-MEASUREMENT FLAG | STATE BEFORE OCCURRENCE OF INCONSISTENCY |
|---|---|---|---|
| 0x400 | 100 (ms) | 1 | NOT CONTROLLED |

UNAUTHORIZED CONTROL SUPPRESSION METHOD, UNAUTHORIZED CONTROL SUPPRESSION DEVICE, AND ONBOARD NETWORK SYSTEM

CROSS REFERENCE TO RELATED APPLICATIONS

This is a continuation of U.S. patent application Ser. No. 16/031,079, filed Jul. 10, 2018, which is a continuation of International Patent Appl. No. PCT/JP2017/023470, filed Jun. 27, 2017, which claims priority to Japanese Patent Appl. No. 2016-133760, filed Jul. 5, 2016, and to Japanese Patent Appl. No. 2017-080059, filed Apr. 13, 2017. The entire disclosure of each of the above-identified documents, including the specification, drawings, and claims, is incorporated herein by reference in its entirety.

BACKGROUND

1. Technical Field

The present disclosure relates to security measures technology for prevention of unauthorized messages being sent onto a network and a vehicle or the like being unauthorizedly controlled.

2. Description of the Related Art

In recent years, a great number of devices called electronic control units (ECU) have been placed in systems in automobiles. A network connecting these ECUs is referred to as an onboard network. Many communication standards exist for onboard networks. One of the most mainstream of these onboard networks is a standard called controller area network (CAN), that is stipulated in ISO11898.

In CAN, a communication channel is a bus configured using two wires, and each ECU connected to the buses is called a node. Each node connected to a bus transmits/receives messages called frames. A transmitting node that transmits a frame applies voltage to the two wires, and generates potential difference between the wires, thereby transmitting a value "1" called recessive, and a value "0" called dominant. In a case where multiple transmitting nodes transmit recessive and dominant at exactly the same timing, the dominant is transmitted with priority. In a case where there is an abnormality in the format of a received frame, a receiving node transmits a frame called an error frame. An error frame is a continuous transmission of six bits dominant, thereby notifying the transmitting node and other receiving nodes that there is an abnormality in a frame.

No identifiers indicating the transmission destination or transmission source exist in CAN, with the transmitting node attaching an ID to each frame and transmitting, and the receiving nodes only receiving frames of a predetermined ID. The Carrier Sense Multiple Access/Collision Avoidance (CSMA/CA) format is employed, so when multiple nodes transmit at the same time, arbitration by ID is performed, with frames having a smaller ID value being transmitted with higher priority.

There is a threat to CAN onboard network systems in that an attacker might unauthorizedly control an ECU by accessing the bus and transmitting unauthorized frames, and security measures are being studied. For example, Japanese Patent No. 5,664,799 describes a method where a frame is judged to be unauthorized in a case where difference between a reception intervals measured regarding frames transmitted to a CAN bus, and communication intervals stipulated beforehand, deviate from a stipulated range, thereby preventing control by unauthorized frames. Also, Japanese Patent No. 5,919,205 describes a method, where in a case of having received two or more frames having the same identifier within a stipulated communication interval, these frames are each discarded, thereby preventing control by unauthorized frames.

SUMMARY

However, the method according to Japanese Patent No. 5,664,799 cannot prevent unauthorized control by unauthorized frames that do not deviate from the stipulated communication interval. Further, the method according to Japanese Patent No. 5,919,205 discards both the unauthorized frame and the normal frame that have the same identifier within the stipulated communication interval, which is inappropriate from the perspective of safety of vehicle control. Also, this method cannot handle unauthorized frames having the same identifier as a normal frame that is transmitted irregularly.

One non-limiting and exemplary embodiment provides an unauthorized control suppression method that can appropriately suppress unauthorized control by unauthorized frames sent onto a network, and also provides an unauthorized control suppression device and onboard network system that can appropriately suppress unauthorized control by unauthorized frames.

In one general aspect, the techniques disclosed here feature an unauthorized control suppression method in a network system, the network system including a plurality of electronic controllers that exchange, via a communication channel, a plurality of frames, the plurality of frames including at least one control frame that instructs predetermined control to an object of control. The unauthorized control suppression method includes receiving, sequentially, the plurality of frames from the communication channel, and determining whether the predetermined control, instructed by the control frame received in the receiving, is to be suppressed, based on a set of frames received in the receiving, wherein the set of frames is received in the receiving within a predetermined period preceding a time of reception of the control frame.

According to the above configuration, unauthorized control by unauthorized frames sent onto a network is appropriately suppressed.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of frame reception history information that the monitoring ECU according to the first embodiment uses;

FIG. 6 is a diagram illustrating an example of vehicle state information that the monitoring ECU according to the first embodiment uses;

FIGS. 9A through 9C are diagrams illustrating examples of data frames that various types of ECUs transmit;

FIG. 15 is a diagram illustrating an example of frame reception history information that the monitoring ECU according to the second embodiment uses;

FIG. 16 is a diagram illustrating an example of function restricting rules that the monitoring ECU according to the second embodiment uses;

FIG. 23 is a diagram illustrating an example of frame reception history information that the monitoring ECU according to the third embodiment uses;

FIG. 24 is a diagram illustrating an example of function restricting rules that the monitoring ECU according to the third embodiment uses;

FIG. 25 is a diagram illustrating an example of measurement-related information that the monitoring ECU according to the third embodiment uses;

DETAILED DESCRIPTION

Figure 1:
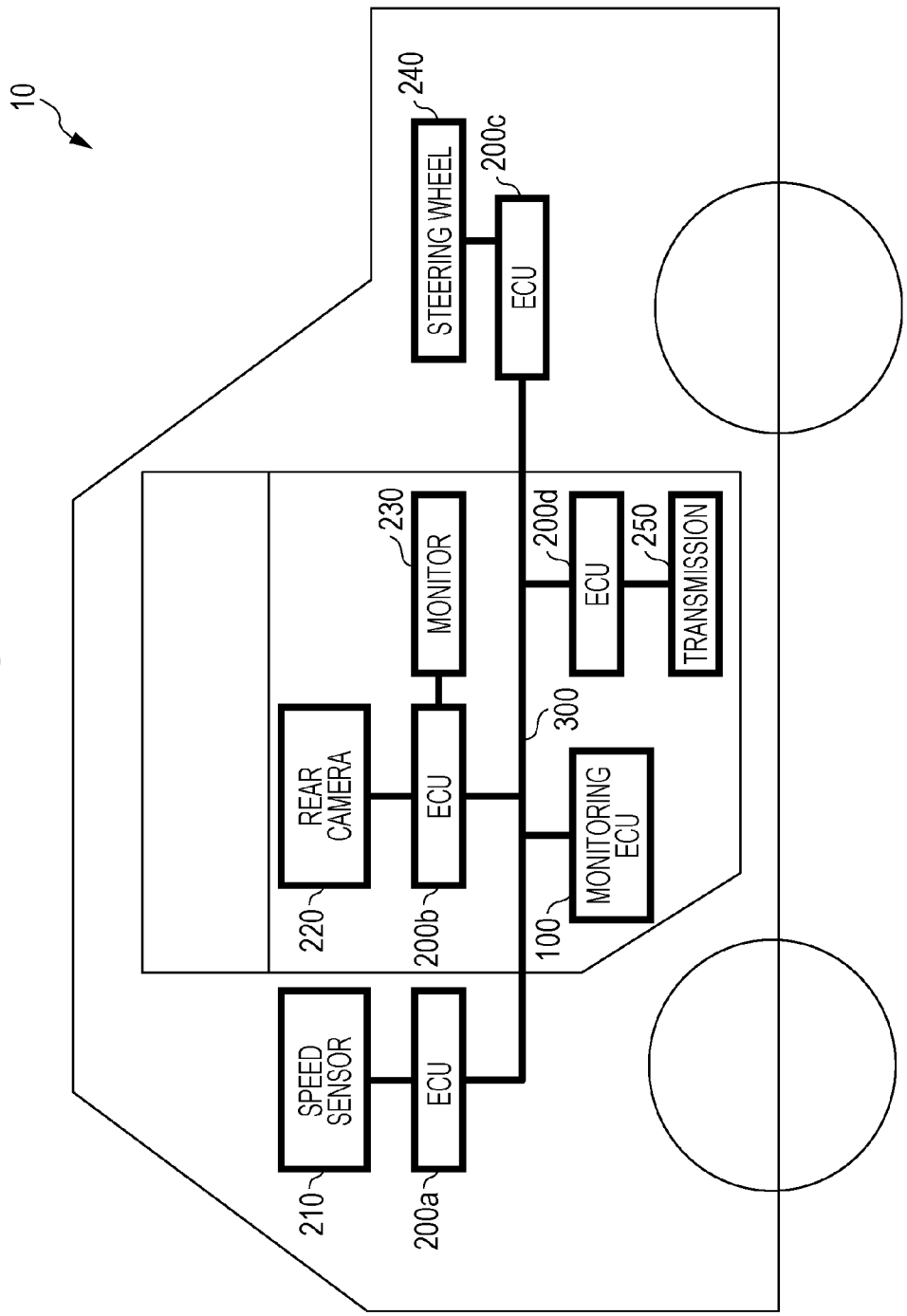
FIG. 1 is a diagram illustrating the overall configuration of an onboard network system according to a first embodiment.

An unauthorized control suppression method according to an aspect of the present disclosure is unauthorized control suppression method in a network system, the network system including a plurality of electronic controllers that exchange, via a communication channel, a plurality of frames, the plurality of frames including at least one control frame that instructs predetermined control to an object of control. The unauthorized control suppression method includes receiving, sequentially, the plurality of frames from the communication channel, and determining whether the predetermined control, instructed by the control frame received in the receiving, is to be suppressed, based on a set of frames received in the receiving, wherein the set of frames is received in the receiving within a predetermined period preceding a time of reception of the control frame. Accordingly, whether or not the object of control is in an abnormal state in the predetermined period can be identified from the set of frames received in the predetermined period, so determination can be appropriately made regarding whether or not to suppress control by the control frame.

The plurality of frames further includes at least one state frame that includes information relating to a state of the object of control. In the determining, whether the predetermined control is to be suppressed may be determined based on whether the state of the object of control, within the predetermined period, satisfies a predetermined condition, the state of the object of control being identified based on the state frame, and the state frame is received in the receiving within the predetermined period preceding the time of reception of the control frame. For example, a predetermined reference is set so as to capture a counterfeited state of an object of control such as a vehicle or the like. Accordingly, in a case where an attacker has transmitted an unauthorized control frame for controlling the object of control, upon having made preliminary preparation to counterfeit the state of the object of control, determination can be appropriately made to that control by the unauthorized control frame should be suppressed.

In the determining, the state of the object of control may be identified as being a counterfeited state in a case where the state frame includes an abnormal state frame, in the determining, the state of the object of control is identified as not being the counterfeited state in a case where the state frame does not include the abnormal state frame. The predetermined condition may be satisfied when the state of the object of control is identified as being the counterfeited state, and the predetermined condition is not satisfied when the state of the object of control is identified as not being the counterfeited state. An example of an abnormal state frame is a state frame including data indicating a value different from a normally-assumable value. Accordingly, in a case where an attacker counterfeits the state of the object of control and transmits an unauthorized control frame to control the object of control, the unauthorized control frame can be suppressed.

In the determining, the state of the object of control may be identified as being the counterfeited state in a case where a plurality of state frames received in the receiving within the predetermined period is received at a reception interval shorter than a predetermined threshold value, the plurality of state frames each indicating information of a same item to be used for execution of the predetermined control, the plurality of state frames being received at the reception interval shorter than the predetermined threshold value due to the abnormal state frame being included in the plurality of state frame. Accordingly, identification of a counterfeited state can be appropriately performed, by setting an appropriate predetermined threshold value with a margin for transmission intervals of state frames set beforehand taken into consideration. For example, in a case where the predetermined control is steering wheel control of the vehicle, and multiple state frames indicating a target steering angle used to execute the steering wheel control are received in a shorter reception interval than the predetermined threshold value based on the margin, the state of the object of control such as the vehicle or the like can be appropriately identified as being a counterfeited state. Accordingly, unauthorized predetermined control can be appropriately suppressed.

In the determining, the state of the object of control may be identified as being the counterfeited state in a case where a number of state frames received in the receiving within the predetermined period is greater than a predetermined number, each of the state frames indicating information of a same item to be used for execution of the predetermined control, the number of state frames being greater than the predetermined number due to the abnormal state frame being included in the number of state frames. Accordingly, a counterfeited state where state frames are redundantly transmitted can be appropriately identified.

In the determining, the state of the object of control may be identified as being the counterfeited state in a case where a difference between values of information of two state frames received in the receiving within the predetermined period is greater than a predetermined amount, the two state frames each indicating the information of a same item to be used for execution of the predetermined control, the difference between the values being greater than the predetermined amount due to the abnormal state frame being included in the two state frames. Accordingly, in a case where a state frame of a value representing the true state of the object of control, and a state frame transmitted by an attacker and representing a counterfeit state that differs from the true state, coexist, such a counterfeited state can be appropriately identified since values of information indicated by a state frame can vary more greatly than a predetermined amount.

In the determining, the state of the object of control may be identified as being the counterfeited state in a case where an order of reception of values of information arrayed in a plurality of state frames received in the receiving within the predetermined period do not follow a predetermined rule, the plurality of state frames each indicating the information of a same item to be used for execution of the predetermined control, the order of reception of the values of the information arrayed in the plurality of state frames not following the predetermined rule due to the abnormal state frame being included in the plurality of state frames. Accordingly, in a case where a predetermined rule has been set such as a first state and a second state are transitioned through before the state of the vehicle changes to a third state, for example, a counterfeited state is identified if a state frame indicating the third state is received next to a state frame indicating that the state of the vehicle is the first state. Accordingly, a counterfeited state can be appropriately identified by appropriately setting predetermined rules corresponding to specifications of the vehicle or the like that is the object of control, for example.

In the determining, the predetermined condition may be satisfied in a case where the state of the object of control in the predetermined period is not a stable state, in the determining, the predetermined condition is not satisfied in a case where the state of the object of control in the predetermined period is a stable state. The stable state may be a state where a data value of a particular state frame indicating the state of the object of control is a state of being a certain value or within a certain range. The state frame is received in the receiving within the predetermined period immediately preceding and consecutive to the time of reception of the control frame. Accordingly, in a case where an attacker transmits a state frame counterfeiting the state of the object of control before transmitting an unauthorized control frame, and the state of the object of control has deviated from a stable state, determination can be appropriately made that control by the unauthorized control frame should be suppressed.

In the determining, the predetermined condition may be satisfied in a case where the state of the object of control in the predetermined period is a frequent-change-occurrence state where change occurs more than a predetermined number of times, and in the determining, the predetermined condition is not satisfied in a case where the state of the object of control in the predetermined period is not the frequent-change-occurrence state. This change is, for example, change that exceeds a certain amount in a case where the state is quantitatively expressed, or change where a sector changes in a case where the state is expressed separated into multiple sectors, or the like. Accordingly, in a case where normally-transmitted frames and frames transmitted by an attacker alternately appear on the communication channel or the like, and inconsistency is occurring in information indicated by these frames not instantaneously, but as viewed over a predetermined period, determination can be appropriately made that control by an unauthorized control frame transmitted by an attacker should be suppressed.

The unauthorized control suppression method may further include executing predetermined processing for suppressing the predetermined control, in a case where a determination is made in the determining that the predetermined control based on the control frame is to be suppressed. The predetermined processing may include any one of processing of discarding the control frame, processing of overwriting the control frame on the communication channel, processing of suppressing transfer of the control frame to another communication channel, and processing of instructing the plurality of electronic controllers to not execute the predetermined control based on the control frame. Accordingly, predetermined control based on an unauthorized control frame transmitted by an attacker can be appropriately suppressed.

The object of control may be a vehicle which includes the network system, the communication channel may be a wired communication channel in the vehicle, and the plurality of electronic controllers may exchange the plurality of frames following a CAN protocol or Ethernet (registered trademark) protocol. Accordingly, security of the onboard network can be secured.

The predetermined control may relate to traveling of the vehicle. Also, in the receiving, sequential reception may be performed of state frames include any one of vehicle speed, rotation speed of wheels, yaw rate, acceleration, steering angle, accelerator pedal angle, braking level, engine revolutions, electric motor revolutions, gearshift position, and state of ignition switch. This enables prevention of an attack by an attacker to take over traveling of the vehicle.

The unauthorized control suppression method may further include transmitting an error frame. The plurality of frames may further include a state frame including information relating to a state of the object of control. The plurality of electronic controllers may be connected to a network bus that is the communication channel, and exchanges state frames and control frames that are data frames, according to the CAN protocol. In a case that the predetermined control is determined to be suppressed, the error frame may be transmitted to the network bus in the transmitting, to overwrite at least part of the control frame. Thus, control frames can be efficiently invalidated on the onboard network.

An unauthorized control suppression device according to an aspect of the present disclosure is an unauthorized control suppression device, connected to a communication channel over which a plurality of electronic controllers exchanges a plurality of frames, the plurality of frames including at least one control frame that instructs an object of control to perform predetermined control. The unauthorized control suppression device includes a receiver that sequentially receives the plurality of frames from the communication channel, and circuitry that, in operation, performs operations including determining whether the predetermined control, instructed by the control frame received by the receiver, is to be suppressed, based on a set of frames received by the receiver, wherein the set of frames is received by the receiver within a predetermined period preceding a time of reception of the control frame. Accordingly, when the object of control is in an abnormal state in a predetermined period from the set of frames received in the predetermined period, determination can be appropriately made that control by the control frame should be suppressed. Appropriately performing suppression regarding control can be realized based on this appropriate determination. Further, the unauthorized control suppression device can be used simply by connecting to the communication channel of the network system configured of multiple electronic control units, and accordingly can be introduced without largely changing the configuration of the network system.

An onboard network system according to an aspect of the present disclosure is an onboard network system including a plurality of electronic controllers that exchanges state frames and control frames, via a network bus, the state frames including information relating to a state of a vehicle, the control frames instructing the vehicle to perform predetermined control. The onboard network system includes a receiver that sequentially receives the state frames and the control frames from the network bus, and circuitry that, in operation, performs operations including determining whether the predetermined control, instructed by a control frame received by the receiver, is to be suppressed, based on whether a state of the vehicle in a predetermined period preceding a time of reception of the control frame satisfies a predetermined condition. The state of the vehicle is identified in the predetermined period preceding the time of reception of the control frame based on a set of the state frames received by the receiver within the predetermined period. Accordingly, by setting a predetermined reference so as to capture a counterfeited state of the vehicle, in a case where an attacker has transmitted an unauthorized control frame for controlling the vehicle for example, upon having made preliminary preparation to counterfeit the state of the vehicle, determination can be appropriately made to that control by the unauthorized control frame should be suppressed. Accordingly, this onboard network system can appropriately protect from attacks.

It should be noted that these general or specific embodiments may be implemented as a system, a method, an integrated circuit, a computer program, or a computer-readable recording medium such as a CD-ROM, and may be realized by any combination of a system, method, integrated circuit, computer program, and recording medium.

An onboard network system including a monitoring ECU using the unauthorized control suppression method according to embodiments will be described below with reference to the drawings. Note that the embodiments described below are all specific examples of the present disclosure. Accordingly, values, components, placements and connected states of components, steps that are components of processing, the order of steps, and so forth, illustrated in the following embodiments, are only exemplary, and do not restrict the present disclosure. Components in the following embodiments which are not included in an independent Claim are optionally addable components. The drawings are schematic diagrams, and are not necessarily created in an exact manner.

First Embodiment

An onboard network system 10 including a monitoring ECU that monitors frames flowing over an onboard network will be described as a first embodiment of the present disclosure, with reference to the drawings.

1.1 Overall Configuration of Onboard Network System 10

FIG. 1 is a diagram illustrating the overall configuration of the onboard network system 10 according to the first embodiment. The onboard network system 10 is an example of a network communication system that communicates according to the CAN protocol, and is a network communication system in an automobile in which various types of devices have been installed, such as a control device, sensor, actuator, user interface device, and so forth. The onboard network system 10 has multiple devices that perform communication relating to frames via the bus, using the unauthorized control suppression method. Specifically, as illustrated in FIG. 1, the onboard network system 10 includes a bus 300, a monitoring ECU 100, ECUs 200*a* through 200*d*, and so forth, connected to the bus 300. Note that many other ECUs besides the monitoring ECU 100 and ECUs 200*a* through 200*d* are included in the onboard network system 10, but description will be made here focusing on the monitoring ECU 100 and ECUs 200*a* through 200*d*, for sake of convenience. Multiple ECUs communicate and cooperate in the vehicle in which the onboard network system 10 is installed, thereby realizing a parking support function and so forth, which is one function of an Advanced Driver Assistance System (ADAS), for example.

Each ECU is a device that includes, for example, digital circuits such as a processor (microprocessor), memory, and so forth, analog circuits, communication circuits, and so forth. The memory is read-only memory (ROM), random access memory (RAM), and so forth, capable of storing a program (computer program) to be executed by the processor. Functions of the ECU are realized by the processor operating following the program, for example. A computer program is configured as a combination of multiple command codes representing instructions to the processor, to achieve predetermined functions. ECUs can be connected to various types of devices. The ECU 200*a* is connected to a speed sensor 210. The ECU 200*b* is connected to a rear camera 220 that is a camera that shoots behind the vehicle, and, for example, a monitor 230 that is a touch panel or the like that displays video, graphical user interface (GUI) images, and so forth, and accepts operations. The ECU 200c is connected to a steering wheel 240. The ECU 200d is connected to a transmission 250.

The ECUs exchange frames via the bus 300, following the CAN protocol. The frames exchanged among the ECUs include, for example, data frames including information relating to the state of the vehicle (referred to as state frames), data frames instructing control of the vehicle (referred to as control frames), and so forth. Note that data frames that include state, relating to the state of the vehicle, and also instruct control of the vehicle, i.e., data frames that are both state frames and control frames, may be exchanged among the ECUs.

The ECU 200a includes data of vehicle speed (i.e., speed of the vehicle) obtained from the speed sensor 210 in data frames, and periodically transmits to the bus 300. The ECU 200b displays video of behind the vehicle, obtained from the rear camera 220, on the monitor 230, and lets the driver of the vehicle know of the situation behind. The ECU 200b also accepts a start request from the driver for the parking support function, by a touch operation to the monitor 230. Description will be made here of the parking support function as a function that automatically operates the steering wheel, aiming for a parking space that the driver has specified. By putting the transmission 250 into "reverse", which is a gearshift position for backing up, and performing an operation for requesting start of the parking support function, the driver can back up and park the vehicle in a parking space behind the vehicle simply by performing accelerator and brake operations. Upon receiving a request to start the parking support function from the driver, the ECU 200b calculates a target steering angle relating to the angle to which the steering wheel should be turned, from the information of the rear camera 220, includes a control flag and the target steering angle in a data frame indicating a steering wheel control instruction, and periodically transmits to the bus 300. Now, the control flag of the data frame indicating a steering wheel control instruction indicates that control is to be performed by a value 1, and indicates that no control is to be performed by a value 0. If the control flag is value 1, the data frame indicating steering wheel control instructions is a control frame. The ECU 200c controls the steering wheel 240 in accordance with the control frame of the steering wheel control instruction that has been transmitted from the ECU 200b, thereby changing the direction in which the vehicle is advancing. In a case where confirmation is made that the vehicle speed notified from the ECU 200a is 10 km/h or lower, and the gearshift position of the transmission 250 is "reverse", the ECU 200c controls the steering wheel 240. The ECU 200d includes data indicating the current gearshift position of the transmission 250 in a data frame, and periodically transmits to the bus 300. The state frames indicating vehicle speed and the state frames indicating gearshift position are sequentially transmitted at a generally constant cycle.

The monitoring ECU 100 is a type of ECU serving as an unauthorized control suppression device, and is connected to the bus 300. The monitoring ECU 100 monitors data frames such as state frames, control frames, and so forth, flowing over the bus 300, and in a case of detecting an unauthorized control frame instructing vehicle control, which has been transmitted in an attack by an attacker, invalidates that control frame, thereby suppressing unauthorized vehicle control.

1.2 Data Frame Format

Figure 2:
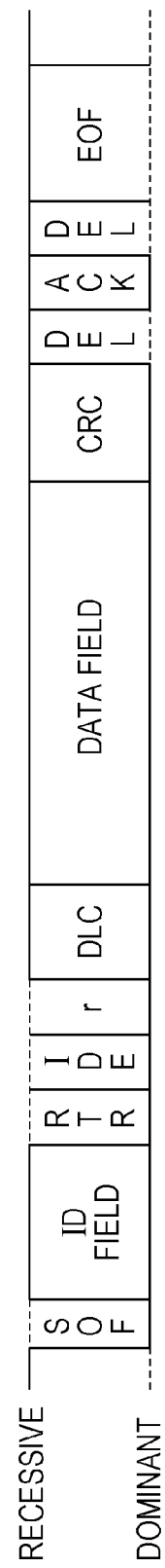
FIG. 2 is a diagram illustrating a format of a data frame stipulated in the CAN protocol.

The following is a description of a data frame which is used on a network according to the CAN protocol. FIG. 2 is a diagram illustrating a format of a data frame stipulated by the CAN protocol. The diagram illustrates a data frame according to a standard ID format stipulated in the CAN protocol. A data frame is configured including the fields of a SOF (Start Of Frame), ID field, RTR (Remote Transmission Request), IDE (Identifier Extension), reserved bit "r", DLC (Data Length Code), data field, CRC (Cyclic Redundancy Check) sequence, CRC delimiter "DEL", ACK (Acknowledgement) slot, ACK delimiter "DEL", and EOF (End Of Frame).

The SOF is made up of 1-bit dominant. The state of the bus is recessive when idle, and start of transmission of a frame is notified by being changed to dominant by the SOF.

The ID field is made up of 11 bits, and is a field storing an ID which is a value indicating the type of data. Design has been implemented so that in a case where multiple nodes start transmission at the same time, frames with smaller ID values are given higher priority, in order to perform communication arbitration by this ID field.

The RTR is a value identifying a data frame and remote frame, and is made up of 1-bit dominant in a data frame. The IDE and "r" are each made up of 1-bit dominant. The DLC is made up of four bits, and is a value indicating the length of the data field.

The data field is a maximum of 64 bits, and is a value indicating the content of the data being transmitted. The length of the data field can be adjusted in 8-bit increments. The CAN protocol does not stipulate the specification of data being transmitted; that is set at the onboard network system 10. Accordingly, the specification is dependent on the model, manufacturer, or the like.

The CRC sequence is made up of 15 bits. The CRC sequence is calculated from the transmitted values of the SOF, ID field, control field, and data field. The CRC delimiter is made up of 1-bit recessive, and is a sectioning symbol representing the end of the CRC sequence.

The ACK slot is made up of one bit. The transmitting node performs transmission with the ACK slot set to recessive. The receiving node transmits the ACK slot as dominant if up to the CRC sequence has been received normally. Dominant has higher priority than recessive, so if the ACK slot is dominant after transmission, so the transmitting node will be able to confirm that one of the receiving nodes has succeeded in reception of the ACK slot if dominant after transmission. The ACK delimiter is made up of 1-bit recessive, and is a sectioning symbol representing the end of the ACK. The EOF is made up of 7-bits recessive, and represents the end of the data frame.

1.3 Error Frame Format

Figure 3:
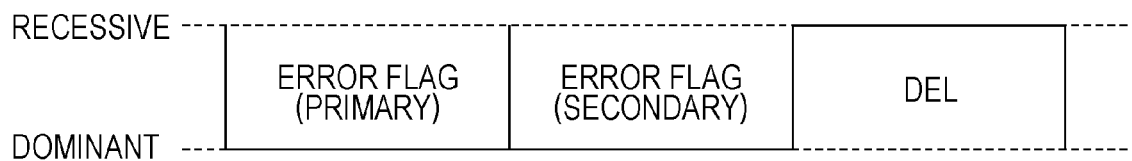
FIG. 3 is a diagram illustrating a format of an error frame stipulated in the CAN protocol.

FIG. 3 is a diagram illustrating the format of the error frame stipulated in the CAN protocol. An error frame is made up of an error flag (primary), error flag (secondary), and an error delimiter "DEL".

The error flag (primary) is used to notify occurrence of an error to other nodes. A node which has detected an error transmits six consecutive bits dominant to notify other nodes of the occurrence of the error. This transmission violates the bit stuffing rule in the CAN protocol (i.e., that six bits or more of the same value are not to be consecutively transmitted), and causes other nodes to transmit an error frame (secondary).

The error flag (secondary) is made up of six consecutive bits dominant, used to notify occurrence of an error to the other nodes. All nodes that have received the error flag (primary) and detected the violation of the bit stuffing rule will transmit the error flag (secondary). The error delimiter "DEL" is an 8-bit consecutive recessive, and indicates the end of the error frame.

1.4 Configuration of Monitoring ECU 100

Figure 4:
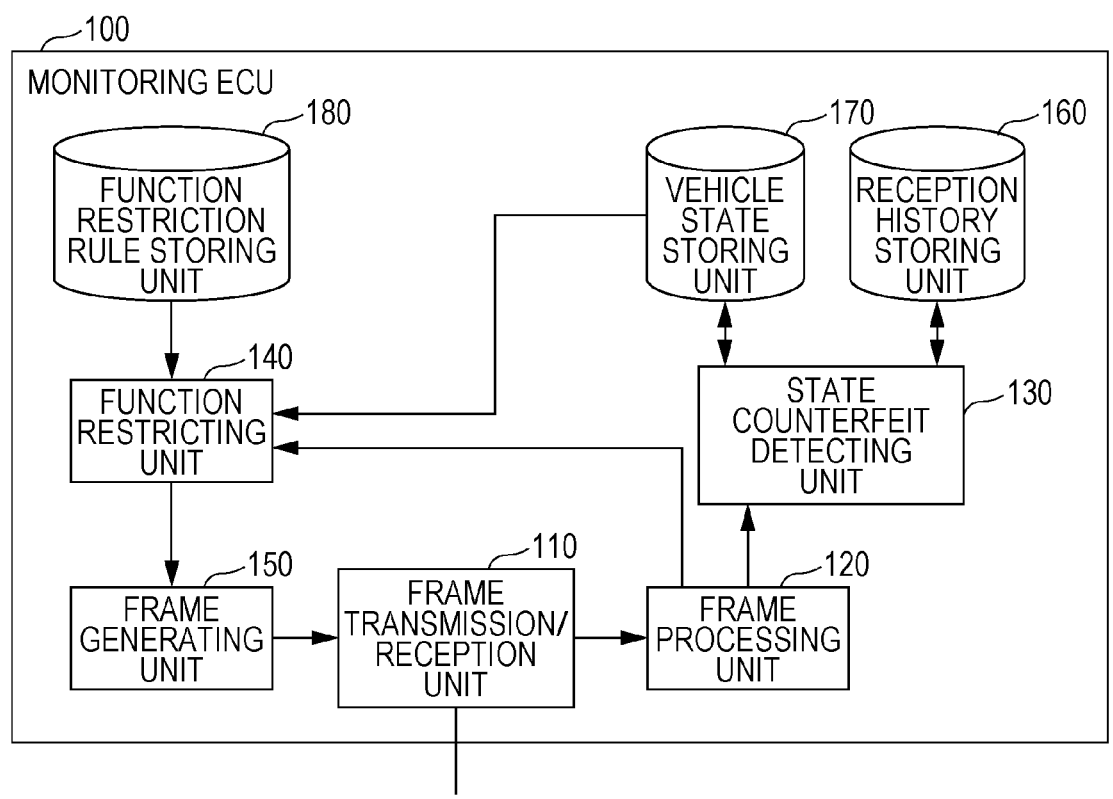
FIG. 4 is a configuration diagram of a monitoring ECU according to the first embodiment.

FIG. 4 is a configuration diagram of the monitoring ECU 100. The monitoring ECU 100 is configured including a frame transmission/reception unit 110, a frame processing unit 120, a state counterfeit detecting unit 130, a function restricting unit 140, a frame generating unit 150, a reception history storing unit 160, a vehicle state storing unit 170, and a function restriction rule storing unit 180. The components of the monitoring ECU 100 illustrated in FIG. 4 can be realized by a storage medium such as memory or the like of the monitoring ECU 100, a communication circuit, and a processor or the like that executes programs stored in memory.

The frame transmission/reception unit 110 transmits/receives frames following the CAN protocol to and from the bus 300. The frame transmission/reception unit 110 has a function of serving as a receiver that receives frames from the bus 300, one bit at a time. Upon having received a data frame, the frame transmission/reception unit 110 transmits information such as the ID, DLC, data, and so forth, within the data frame, to the frame processing unit 120. In a case of having judged that a data frame does not conform to the CAN protocol, the frame transmission/reception unit 110 transmits an error frame. Also, in a case of having received an error frame while receiving data frames, i.e., in a case of interpreting that a received data frame is an error frame from values thereof, the frame transmission/reception unit 110 discards the rest of that data frame. In a case of having received a transmission request for a data frame from the frame generating unit 150, the frame transmission/reception unit 110 transmits the content of that data frame to the bus 300 one bit at a time.

The frame processing unit 120 receives information of data frames from the frame transmission/reception unit 110, and interprets the contents of the data frames. The frame processing unit 120 also notifies the state counterfeit detecting unit 130 and function restricting unit 140 regarding the data frame being received.

The state counterfeit detecting unit 130 performs counterfeit detection processing by referencing reception history information that the reception history storing unit 160 stores, regarding whether or not the state of the vehicle has been counterfeited or not. The reception history information is information of reception history of data frames. The state counterfeit detecting unit 130 determines whether or not the state of the vehicle has been counterfeited, according to whether or not data frames with the same ID have been received within a range starting from a data frame received in advance, to a margin centered on the end of the transmission interval thereof, based on the transmission intervals of data frames stipulated beforehand for each ID. For example, in a case where the transmission interval of a data frame, which is a state frame relating to vehicle speed having an ID of "0x100" that the ECU 200a periodically transmits, is stipulated beforehand to be 50 ms, the number of data frames of ID "0x100" expected to be received by the monitoring ECU 100 in a period T, which is time over a range of time of reception of that data frame+50 ms−margin to time of reception of that data frame+50 ms+margin is 1. However, in a case where an attacker has transmitted a data frame of ID "0x100" in this time, this means that this, and the data frame of ID "0x100" normally transmitted from the ECU 200a, i.e., two data frames of ID "0x100" will be received by the monitoring ECU 100 within the period T. In such a case, the state counterfeit detecting unit 130 determines that this is a counterfeited state where the state of the vehicle has been counterfeited regarding the vehicle speed indicated by the state frame of ID "0x100". Note that in a case where two data frames of ID "0x100" have been received by the monitoring ECU 100 in the period T, an abnormal state frame will be included in the state frames received at the monitoring ECU 100. In a case where such an abnormal state frame has been received, the state counterfeit detecting unit 130 determines that the state of the vehicle indicated by the state frames of the same ID is in a counterfeited state. The state counterfeit detecting unit 130 stores information regarding transmission intervals, stipulated beforehand for each ID of state frames regarding which determination of counterfeiting is to be performed. The margin that the state counterfeit detecting unit 130 uses is appropriately determined so as to permit fluctuation in normally-transmitted data frame transmission intervals, and is determined to be 3 ms or the like, for example. The state counterfeit detecting unit 130 also updates vehicle state information stored in the vehicle state storing unit 170, in accordance with the determination results in the counterfeit detection processing. The state counterfeit detecting unit 130 also updates reception history information stored in the reception history storing unit 160, based on the values of data in state frames transmitted from the ECU 200a, ECU 200d, and so forth, and the point in time of reception of those state frames. In this updating, the state counterfeit detecting unit 130 obtains the point in time at which state frames have been received, by a timer that counts elapsed time from the time of activation of the monitoring ECU 100 for example, or from some other predetermined time, and records in the reception history information.

The function restricting unit 140 determines whether or not control of the vehicle should be suppressed at the time of having received a control frame for controlling the vehicle, by referencing vehicle state information stored in the vehicle state storing unit 170 and function restricting rules, serving as a reference regarding whether or not control of the vehicle should be suppressed, stored in the function restriction rule storing unit 180. In a case of having determined that control of the vehicle should be suppressed, the function restricting unit 140 requests the frame generating unit 150 to transmit an error frame, to invalidate the control frame being received. The control frame being received is overwritten on the bus 300 by this error frame, and thus the control frame is invalidated. ECUs such as the ECU 200c cannot receive the entire control frame in a complete state from the bus 300 due to the effects of overwriting by the error frame, so control following the control frame is not performed.

In a case where transmission of a frame is requested, the frame generating unit 150 causes the frame transmission/reception unit 110 to transmit that frame. In a case where transmission of a data frame is requested, the frame generating unit 150 generates a data frame, and causes the frame transmission/reception unit 110 to transmit that data frame.

The reception history storing unit 160 stores reception history of data frames that the monitoring ECU 100 has received. The reception history storing unit 160 stores reception history information (see FIG. 5) indicating the data values and reception time of state frames received in the last 100 ms, for example.

The vehicle state storing unit 170 stores vehicle state information (see FIG. 6) indicating the vehicle state determined in the counterfeit detection processing performed by the state counterfeit detecting unit 130.

The function restriction rule storing unit 180 stores function restricting rules (see FIG. 7) that serve as a determination reference regarding whether or not control by the control frame being received should be suppressed.

1.5 Reception History Information

FIG. 5 illustrates an example of reception history information that the reception history storing unit 160 stores. In the example in FIG. 5, the reception history information includes the reception points in time and data values of the state frames indicating vehicle speed having the ID "0x100", and state frames indicating the gearshift position having an ID "0x300", received in the last 100 ms.

According to the reception history information in this example, the data value of the latest-received state frame of ID "0x100" relating to vehicle speed is 42.1 km/h, and the time of reception is 110 ms. The data value of the vehicle speed state frame received one time back is 0.0 km/h, and the time of reception is 61 ms. The data value of the vehicle speed state frame received two times back is 42.0 km/h, and the time of reception is 60 ms. Further, the data value of the vehicle speed state frame received three times back is 42.0 km/h, and the time of reception is 10 ms. The data value of the latest-received state frame of ID "0x300" relating to gearshift position indicates "drive" which is a gearshift position for the vehicle to travel forward, and the time of reception is 100 ms. The data value of the gearshift position state frame received one time back indicates "drive", and the time of reception is 50 ms. In the example in FIG. 5, no state frame relating to gearshift position was received in further previous times, or was received before the past 100 ms and accordingly is not stored.

1.6 Vehicle State Information

FIG. 6 illustrates an example of vehicle state information that the vehicle state storing unit 170 stores. In the example in FIG. 6, the state of the vehicle relating to state frames regarding vehicle speed having the ID "0x100", and the state of the vehicle relating to state frames regarding the gearshift position having ID "0x300", are indicated as vehicle state information by a counterfeit flag. In this example, the counterfeit flag indicates that the state of the vehicle is in a counterfeited state if 1, and that the state of the vehicle is not in a counterfeited state if 0. A counterfeited state is a state where a state frame indicating a false data value regarding the vehicle state such as vehicle speed, gearshift position, or the like is sent onto the bus 300 by an attacker, for example, which is to say that the state of the vehicle has been counterfeited. The example in FIG. 6 indicates that the state of the vehicle regarding vehicle speed, indicated by the state frame of ID "0x100", is in a counterfeited state. This also indicates that the state of the vehicle regarding gearshift position, indicated by the state frame of ID "0x300", is not in a counterfeited state.

1.7 Function Restricting Rules

Figures 7, 8:
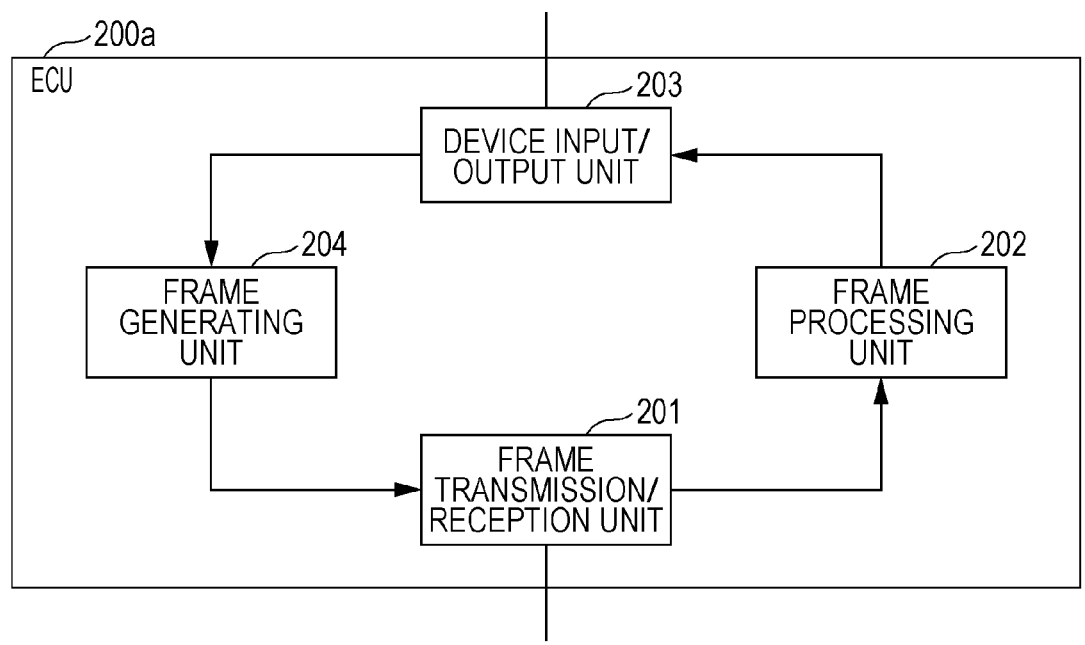
FIG. 7 is a diagram illustrating an example of function restricting rules that the monitoring ECU according to the first embodiment uses.
FIG. 8 is a configuration diagram of an ECU in an onboard network system.

FIG. 7 illustrates an example of function restricting rules that the function restriction rule storing unit 180 stores. The function restricting rules are information indicating a reference for whether or not to suppress control of the vehicle. In the example in FIG. 7, function restriction object, which is information identifying a control frame that performs control of the vehicle, and conditions of the vehicle state that serve as a reference, have been correlated. Although an example where the function restricting rules are configured of rules of multiple items is illustrated in FIG. 7, the number of rule items may be one or multiple.

In this example, the function that is the object of restriction for rule No. 1 is a data frame where a control flag included in a data frame of ID "0x200" relating to steering wheel control instruction is 1 (i.e., a control frame relating to steering wheel control instruction), and vehicle state conditions for suppressing steering wheel control are that the state of the vehicle relating to the state frame of ID "0x100" regarding vehicle speed is in a counterfeited state (i.e., the counterfeit flag is 1). In the same way, the function that is the object of restriction for rule No. 2 also is a control frame relating to steering wheel control instruction, and vehicle state conditions for suppressing steering wheel control are that the state of the vehicle relating to the state frame of ID "0x300" regarding gearshift position is in a counterfeited state (i.e., the counterfeit flag is 1).

The function restricting unit 140 references the function restricting rules, and in a case where the vehicle state conditions corresponding to the function restriction object regarding the control frame being received are satisfied, determines that control of the vehicle by that control frame should be suppressed, and requests the frame generating unit 150 to transmit an error frame to invalidate that control frame. Specifically, in a case of having received a control frame regarding steering wheel control instruction, and the state of the vehicle regarding vehicle speed indicated by the state frame of ID "0x100" in the vehicle state information stored in the vehicle state storing unit 170 is in a counterfeited state (i.e., the counterfeit flag is 1) according to the rule of the item of rule No. 1 in FIG. 7, the function restricting unit 140 makes an error frame transmission request to the frame generating unit 150, to invalidate that control frame. In a case where the state of the vehicle regarding gearshift position indicated by the state frame of ID "0x300" in the vehicle state information is in a counterfeited state (i.e., the counterfeit flag is 1) according to the rule of the item of rule No. 2 in FIG. 7, the function restricting unit 140 makes an error frame transmission request to the frame generating unit 150, to invalidate that control frame regarding steering wheel control instruction. In a case in a case of having received a control frame regarding steering wheel control instruction, the state of the vehicle regarding vehicle speed is not a counterfeited state, nor is the state of the vehicle regarding gearshift position a counterfeited state, the function restricting unit 140 does not make an error frame transmission request.

1.8 Configuration of ECU 200a

FIG. 8 is a configuration diagram of the ECU 200a. The ECU 200a is configured including a frame transmission/reception unit 201, a frame processing unit 202, a device input/output unit 203, and a frame generating unit 204. These components are functional components, the functions thereof being realized by a communication circuit, processor, digital circuit, or the like, in the ECU 200a, executing control programs stored in memory. Note that the ECU 200b, ECU 200c, and ECU 200d have generally the same configuration as the ECU 200a.

The frame transmission/reception unit 201 transmits and receives frames following the CAN protocol to and from the bus 300. The frame transmission/reception unit 201 receives data frames from the bus 300 one bit at a time, an upon completing reception of a data frame without error, transfers information within the data frame, such as ID, DLC, and data, to the frame processing unit 202. In a case of having determined that a data frame does not conform to the CAN protocol, the frame transmission/reception unit 201 transmits an error frame. In a case of having received an error frame while receiving a data frame, the frame transmission/ reception unit 201 discards the rest of the data frame. The frame transmission/reception unit 201 also transmits to the bus 300 the contents of a frame regarding which notification has been received from the frame generating unit 204. Processing conforming to the CAN protocol, such as communication arbitration, is also realized at the frame transmission/reception unit 201.

The frame processing unit 202 interprets the contents of received data frames. This will be described using the ECU 200c that has the same configuration as the ECU 200a as an example. The frame processing unit 202 of the ECU 200c interprets the vehicle speed, steering wheel control instruction, gearshift position, and so forth, included in data frames transmitted from the ECU 200a, ECU 200b, and ECU 200d, and notifies the device input/output unit 203 of control information for control of the steering wheel 240 as necessary. In a case where the vehicle speed notified form the ECU 200a exceeds 10 km/h or the gearshift position notified from the ECU 200d is other than "reverse", the frame processing unit 202 of the ECU 200c does not control the steering wheel 240 even if a control frame relating to steering wheel control instruction (i.e., a data frame having the ID "0x200" and the control flag is 1) is received.

The device input/output unit 203 is configured of a communication circuit or the like that communicates with devices connected to the ECU. The device input/output unit 203 of the ECU 200a obtains the current vehicle speed from the speed sensor 210 and notifies the vehicle speed to the frame generating unit 204 so as to cause it to generate and transmit a data frame indicating the vehicle speed. The device input/output unit 203 of the ECU 200b obtains video data indicating the situation behind the vehicle from the rear camera 220. The device input/output unit 203 of the ECU 200b also accepts driver operations made at the monitor 230 to request starting of the parking support function, calculates a target steering angle for controlling the steering wheel 240 from the situation behind the vehicle, and notifies the frame generating unit 204 of the target steering angle, in order to generate a control frame relating to the steering wheel control instruction. The device input/output unit 203 of the ECU 200c controls the steering wheel 240 in accordance with the control information based on the control frame relating to steering wheel control instruction notified from the ECU 200b, and so forth. The device input/output unit 203 of the ECU 200d obtains the current gearshift position from the transmission 250, and notifies the gearshift position to the frame generating unit 204 so as to cause it to generate and transmit a data frame indicating the gearshift position.

The frame generating unit 204 generates data frames to be transmitted to the bus 300 based on information notified from the device input/output unit 203, and transmits the generated data frames to the bus 300 via the frame transmission/reception unit 201. For example, at the ECU 200a, the frame generating unit 204 generates data frames containing information of the vehicle speed from the speed sensor 210 that has been notified from the device input/output unit 203 at 50 ms intervals which is a cycle set beforehand, and makes notification to the frame transmission/reception unit 201. Note that 50 ms as an interval for generating data frames is only an example of a cycle, and may be other than 50 ms. Examples of data frames that the ECU 200a, ECU 200b, and ECU 200d respectively transmit will be described with reference to FIGS. 9A through 9C next.

1.9 Data Frames Transmitted by ECUs

FIGS. 9A through 9C illustrate examples of data frames transmitted by each of the ECU 200a, ECU 200b, and ECU 200d. The example in FIG. 9A is a data frame that the ECU 200a transmits, i.e., a state frame relating to vehicle speed. This state frame relating to vehicle speed has the ID "0x100", the DLC is 2, and the data field thereof represents the vehicle speed (in increments of 0.1 km/h) by two bytes of the first byte and the second byte combined. The example of the data frame in FIG. 9A represents a state frame indicating vehicle speed that is 42.1 km/h (0x1A5).

The example in FIG. 9B is a data frame that the ECU 200b transmits, i.e., a data frame relating to steering wheel control instruction. This data frame relating to steering wheel control instruction has the ID "0x200", the DLC is 4, and the first byte in the data field thereof represents a control flag indicating whether or not to perform steering wheel control. In a case of 1, this indicates that control of the steering wheel 240 should be performed, and in a case of 0, this indicates that control of the steering wheel 240 should not be performed. The second byte indicates which direction of left or right the steering wheel 240 should be turned to in a case of instructing steering wheel control. 0 indicates right, and 1 left. The two bytes of the third byte and the fourth byte combined indicate the target steering angle for controlling the steering wheel 240. The example of the data frame in FIG. 9B represents a control frame indicating a steering wheel control instruction to turn 48 degrees to the right.

The example in FIG. 9C is a data frame that the ECU 200d transmits, i.e., a state frame relating to gearshift position. This state frame relating to gearshift position has the ID "0x300", the DLC is 1, and the data field thereof represents the gearshift position with one byte. A value of 0 of that one byte represents "neutral", 1 represents "reverse", 2 represents "drive", and 3 represents "park". The example of the data frame in FIG. 9C represents a state frame indicating "reverse" for the gearshift position.

1.10 Sequence of Parking Support Function

Figure 10:
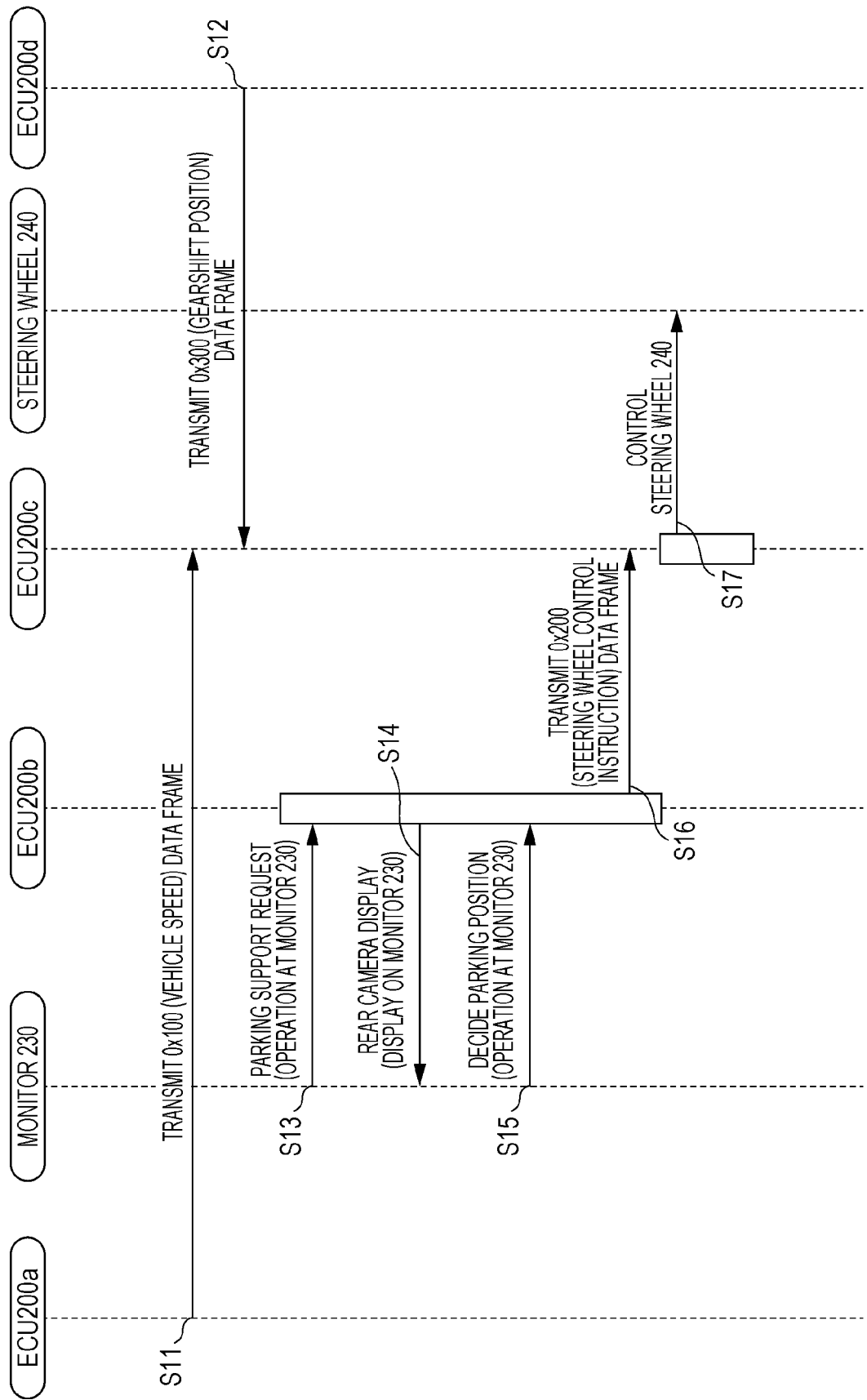
FIG. 10 is a diagram illustrating a processing sequence of a parking support function according to the first embodiment.

FIG. 10 illustrates an example of a processing sequence relating to the parking support function in a normal state. The ECU 200a transmits a state frame indicating the vehicle speed (i.e., a data frame having the ID "0x100") to the bus 300 (step S11). The data frame is broadcast to all ECUs connected to the bus 300. The ECU 200c that handles control of the steering wheel 240 receives a state frame indicating the vehicle speed from the bus 300 as a data frame of an ID that should be received, and updates and stores the current vehicle speed based on that state frame. Note that although the ECU 200a transmits state frames indicating vehicle state in 50 ms transmission intervals, stipulated beforehand, transmission of subsequent state frames relating to vehicle speed has been omitted from illustration in FIG. 10.

The ECU 200d transmits a state frame indicating the gearshift position (i.e., a data frame having the ID "0x300") to the bus 300 (step S12). The ECU 200c receives the state frame indicating the gearshift position from the bus 300 as a data frame of an ID that should be received, and updates and stores the current gearshift position based on that state frame. Note that although the ECU 200d transmits state frames indicating gearshift position in 50 ms transmission intervals, transmission of subsequent state frames relating to gearshift position has been omitted from illustration in FIG. 10.

When the driver performs an operation at the monitor 230 for starting execution of the parking support function, a parking support request is notified from the monitor 230 to the ECU 200b (step S13).

Upon being notified of the parking support request, the ECU 200*b* displays video of behind the vehicle, that has been obtained from the rear camera 220 on the monitor 230 (step S14).

Upon the driver viewing the video displayed on the monitor 230 and specifying a parking position by operating the monitor 230, the monitor 230 sends the ECU 200*b* a parking position decision notification indicating that parking position (step S15).

The ECU 200*b* calculates a steering angle of the steering wheel 240 to serve as a target (i.e., a target steering angle) based on the parking position indicated by the parking position decision notification, sets the control flag to 1 in a data frame having the ID "0x200", includes information of the target steering angle therein, and transmits the data frame (S16). That is to say, the ECU 200*b* transmits a control frame relating to steering wheel control instruction. Note that while the ECU 200*b* sequentially updates the target steering angle of the steering wheel 240 to an appropriate value and periodically transmits data frames having the ID "0x200", transmission of subsequent data frames having the ID "0x200" is omitted from FIG. 10.

Only in a case where the ECU 200*c* receives the control frame relating to steering wheel control instruction (i.e., the data frame having the ID "0x200" and having the control flag set to 1), and also the current vehicle speed is 10 km/h or below, and further the gearshift position is "reverse", does the ECU 200*c* effect control so that the steering wheel 240 is turned to the target steering angle (step S17).

1.11 Sequence Regarding Suppression of Attack on Parking Support Function

Figure 11:
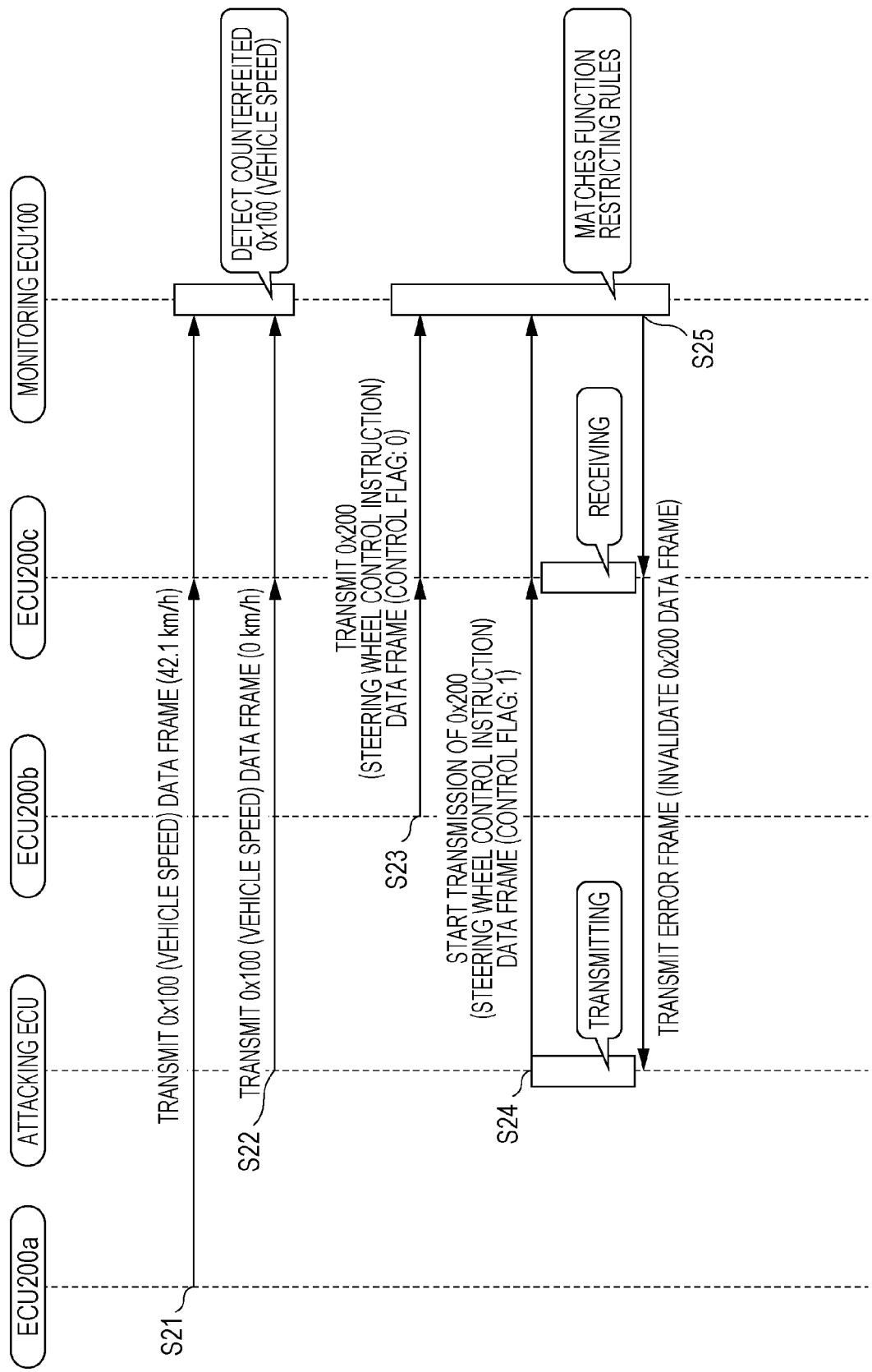
FIG. 11 is a diagram illustrating a sequence of an attack on the parking support function and unauthorized control suppression processing according to the first embodiment.

FIG. 11 illustrates an example of a sequence regarding an attack on the parking support function and unauthorized control suppression processing by the monitoring ECU 100. It will be assumed here that the monitoring ECU 100 stores the function restricting rules illustrated in FIG. 7. Also, an operation for starting execution of the parking support function has not been made, and the vehicle is traveling forward. Further, the ECU 200*d* is periodically transmitting a state frame indicating that the gearshift position is "drive". Description of the state frame regarding gearshift position is omitted from FIG. 11.

The ECU 200*a* transmits a state frame indicating vehicle speed (i.e., a data frame having the ID "0x100") to the bus 300 (step S21). In this example, the current vehicle speed is 42.1 km/h.

In order for the ECU 200*c* to control the steering wheel 240, a condition of the vehicle speed being 10 km/h or lower needs to be satisfied. Accordingly, an attacking ECU transmits a data frame having the ID "0x100" and indicating false information that the vehicle speed is 0 km/h, i.e., a state frame indicating false information regarding vehicle speed, as a preparatory stage to unauthorizedly control the steering wheel 240 (step S22). The attacking ECU is an ECU connected to the bus 300, and is, for example, an ECU which an attacker has connected to the bus 300, an ECU that the attacker has taken over by hacking or the like, etc. Note that the attacking ECU observes the transmission of state frames relating to the vehicle speed by the ECU 200*a*, and transmits a state frame having the same ID and indicating false information regarding the vehicle speed, in during a period in the range of the margin for transmission intervals, that has been stipulated beforehand. This makes it more difficult for a state frame indicating false information regarding vehicle speed to be detected as an unauthorized frame simply by the transmission timing.

The ECU 200*c* that has received the state frame indicating the false information regarding vehicle speed that has been transmitted in step S22 updates the current vehicle speed stored therein to 0 km/h. The monitoring ECU 100 determines, by counterfeit detection processing, that the state of the vehicle regarding vehicle speed indicated by the state frame of ID "0x100" is a counterfeited state, since a state frame of ID "0x100" regarding vehicle speed has been received twice during which reception of one time is expected, i.e., during the period in the range of the margin for transmission intervals that has been stipulated beforehand. Accordingly, the counterfeit flag regarding the vehicle speed in the vehicle state information is set to 1.

The ECU 200*b* transmits a data frame indicating steering wheel control instruction, having ID "0x200" (step S23). Execution of the parking support function has not been started at this time, so the control flag regarding whether or not to perform steering wheel control is 0, and the steering wheel 240 is not controlled. With regard to this, the monitoring ECU 100 does not transmit an error frame or the like, since the control flag included in the data frame having the ID "0x200" is 0, and accordingly is not the object of function restriction by the rules in the function restricting rules.

Next, in order to unauthorizedly control the steering wheel 240, the attacking ECU transmits a data frame having the ID "0x200" and having the control flag set to 1 (i.e., a control frame regarding steering wheel control instruction) (step S24). With regard to this, the monitoring ECU 100 determines, while receiving this control frame, whether or not control of the vehicle should be suppressed, based on the function restricting rules and the vehicle state information. The control frame transmitted in step S24 matches an object of function restriction under the rule of the item that is rule No. 1 in the function restricting rules, and corresponding vehicle state conditions are satisfied, so the monitoring ECU 100 determines that control of the vehicle by that control frame should be suppressed.

Next, since determination has been made that control of the vehicle by the control frame being received should be suppressed, the monitoring ECU 100 transmits an error frame to invalidate this control frame regarding steering wheel control instruction (step S25). The monitoring ECU 100 can suppress unauthorized control of the steering wheel 240 by the attack, by transmitting the error frame. This error frame overwrites the data frame having the ID "0x200", which was being transmitted, thereby interrupting transmission of the data frame by the attacking ECU. The ECU 200*c* receives this error frame, and thus discards the data frame being received and does not perform control of the steering wheel 240 based on that data frame.

Thus, the monitoring ECU 100 can prevent reception by the ECU 200*c* of a data frame for unauthorizedly control the steering wheel 240 by an attacking ECU, by transmitting an error frame in accordance with determination results based on function restricting rules.

1.12 Monitoring Operations by Monitoring ECU 100

Figure 12:
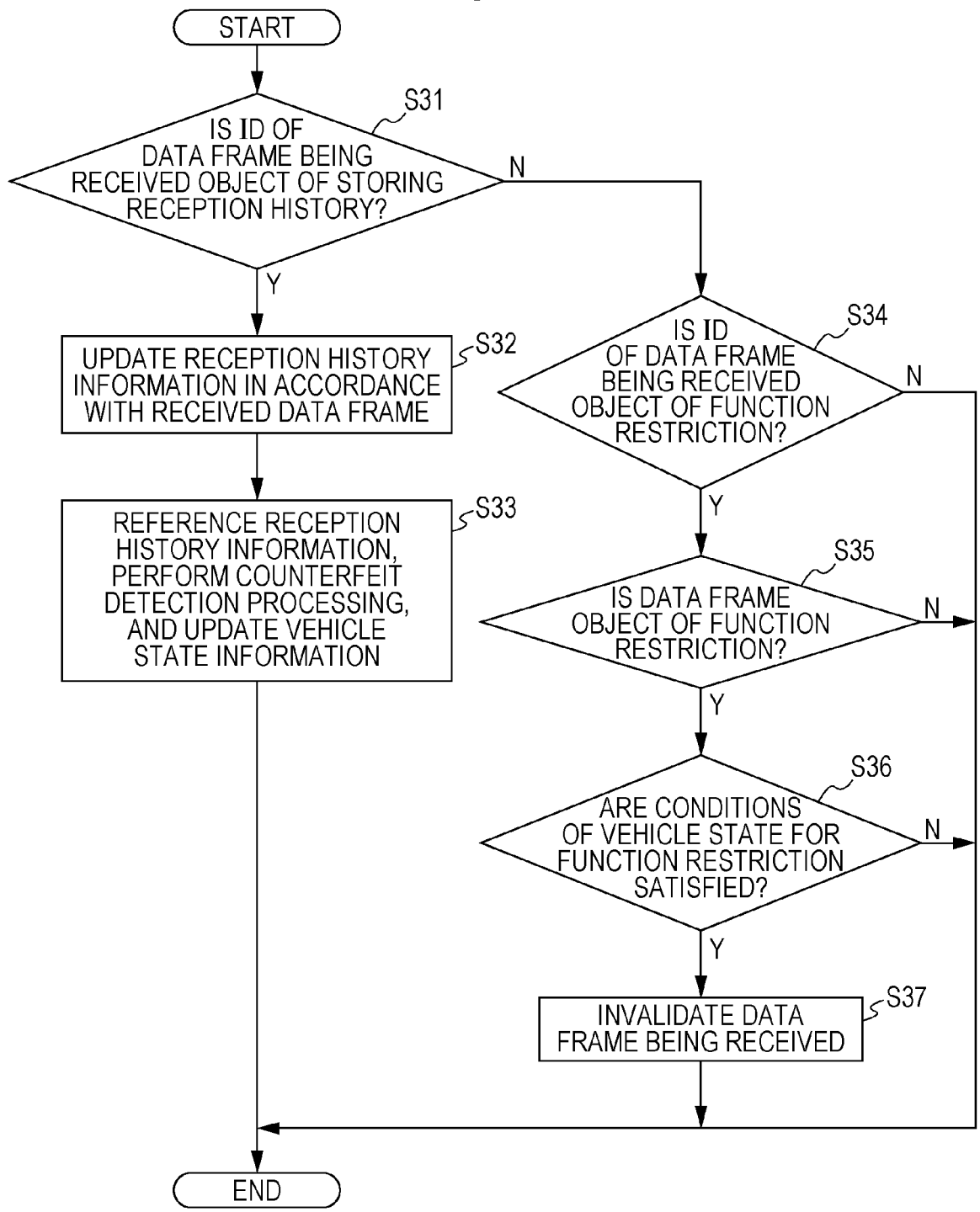
FIG. 12 is a flowchart illustrating an example of monitoring operation by the monitoring ECU according to the first embodiment.

FIG. 12 is a flowchart illustrating an example of monitoring operations by the monitoring ECU 100. This processing regarding this monitoring operations is performed each time a data frame appears on the bus 300. The monitoring ECU 100 receives a data frame, and judge whether or not the ID of the data frame being received is an ID of a data frame of which reception history should be stored in the reception history storing unit 160 (step S31). Although the ID of a data frame to be stored in reception history is different from the ID of a data frame that is an object of function restriction in the function restricting rules in this example, this is only one example. For example, IDs regarding the object of storing in reception history are the ID "0x100" of the state frame regarding vehicle speed, and the ID "0x300" of the state frame regarding gearshift position (see FIG. 5).

In a case where the ID of the data frame being received is the ID of a data frame that should be saved in the reception history in the reception history storing unit 160, the monitoring ECU 100 updates the reception history information that the reception history storing unit 160 stores, so as to include the data value indicating the vehicle speed and so forth in the data frame that is being received, and the time of reception (step S32). Note that at the time of updating this reception history information, the monitoring ECU 100 may delete information of reception history of which the reception time is earlier than a predetermined amount of time (e.g., 100 ms) from the current time, for example.

The monitoring ECU 100 also references the reception history information that the reception history storing unit 160 stores, and performs counterfeit detection processing (step S33). Specifically, the monitoring ECU 100 uses the state counterfeit detecting unit 130 to take a time obtained by adding a transmission interval stipulated beforehand (e.g., 50 ms) to the time of reception of the oldest state frame in the reception history for a state frame (data frame) regarding one ID in the reception history information as a reference for example, and count how many state frames are received in a range between the time of having subtracted a margin (e.g., 3 ms) from the reference time and a time of having added the margin to the reference time (referred to as reception timing range). In a case where two or more state frames have been received, determination is that the state of the vehicle is being counterfeited, and sets the counterfeit flag of the corresponding ID of the vehicle state storing unit 170 to 1. In the same way, the next reception timing range is calculated with a time obtained by adding the transmission interval stipulated beforehand (e.g., 50 ms) to the time of reception of the state frame first received in the reception timing range as a reference, and determination of whether the state of the vehicle has been counterfeited is repeated until the most-recently received state frame. Further, in a case where a state frame not included in any reception time range is included in the reception history, the counterfeit flag is updated to 1. In a case where the counterfeit flag is not set to 1 in such processing, the counterfeit flag is set to 0. Although determination of whether or not the state of the vehicle is a counterfeited state is made in this counterfeit detection processing, identification of whether each state frame indicated by the reception history in the reception history information stored in the reception history storing unit 160 is unauthorized or not (i.e., due to an attack or not), is not made.

In a case of having judged in step S31 that the ID of the data frame being received is not an ID of a data frame that should be stored in the reception history in the reception history storing unit 160, the monitoring ECU 100 judges whether or not this is the ID of a data frame that is the object of function restriction (step S34). In a case of judging that the ID of the data frame being received is not an ID of a data frame that is the object of function restriction, the monitoring ECU 100 ends the processing.

In a case of having judged in step S34 that the ID of the data frame being received is an ID of a data frame that is the object of function restriction, the monitoring ECU 100 judges whether or not the data frame being received is a data frame that is the object of function restriction (step S35). Specifically, the monitoring ECU 100 judges whether or not this is a control frame that is a data frame regarding steering wheel control instruction of which the control flag is 1, by referencing the function restricting rules stored in the function restriction rule storing unit 180. If the data frame being received is not a control frame that is the object of function restriction, the monitoring ECU 100 ends the processing.

In a case where the data frame being received is judged to be a control frame that is the object of function restriction in step S35, the monitoring ECU 100 determines whether or not control of the vehicle regarding that control frame should be suppressed. Specifically, the monitoring ECU 100 receives the function restricting rules and the vehicle state information stored in the vehicle state storing unit 170, and makes this determination by verifying whether or not the control frame is the object of function restriction and the vehicle state conditions thereof are satisfied (step S36). If vehicle state conditions are not satisfied regarding any of the rules of items where the control frame is the object of function restriction in the function restricting rules, as the result of verification in step S36, the monitoring ECU 100 ends the processing.

If vehicle state conditions are satisfied as the result of verification in step S36, the monitoring ECU 100 transmits an error frame to the bus 300 before the tail end of the data frame being received is received, to invalidate the data frame being received (step S37). Accordingly, the data frame being received is overwritten by the error frame, and this data frame is invalidated. Accordingly, ECUs connected to the bus 300 (e.g., the ECU 200c) do not perform control of the vehicle based on the invalidated data frame.

1.13 Advantages of First Embodiment

In the onboard network system 10 according to the first embodiment, the monitoring ECU 100 detects that the state of the vehicle is in a counterfeited state for a certain period by using rules set beforehand regarding transmission intervals of state frames, based on a set of state frames received in the certain period. In a case where the state of the vehicle is in a counterfeited state, the monitoring ECU 100 invalidates the control frame for controlling the vehicle while the control frame is being transmitted, thereby suppressing control of the vehicle. This enables prevention of attacks where the state of the vehicle is counterfeited and the vehicle is unauthorizedly controlled, thereby securing security of the onboard network. The unauthorized control suppression method for this prevention can be realized by disposing the monitoring ECU 100 on the onboard network, so the onboard network can be protected with suppressed costs.

Second Embodiment

An onboard network system 11 that is a partial modification of the onboard network system 10 according to the first embodiment will be described. A monitoring ECU in the onboard network system 11 according to the present embodiment monitors state frames flowing over the onboard network, measures the time over which the current state of the vehicle is continuing, and restricts control functions by control frames controlling the vehicle based on a reference regarding whether or not a stable state of the vehicle has continued for a predetermined amount of time.

2.1 Overall Configuration of Onboard Network System 11

Figure 13:
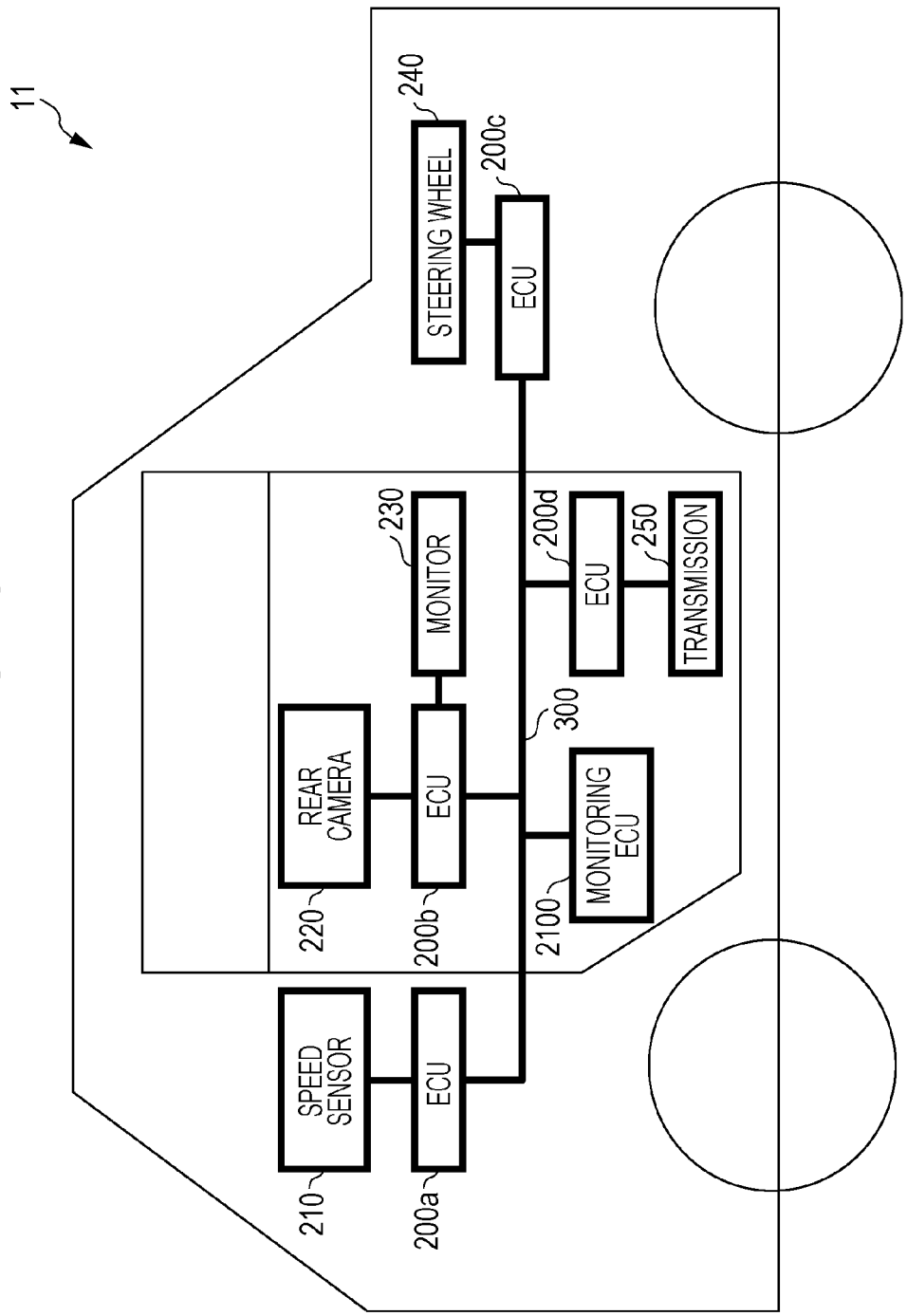
FIG. 13 is a diagram illustrating the overall configuration of an onboard network system according to a second embodiment.

FIG. 13 is a diagram illustrating the overall configuration of the onboard network system 11 according to the present disclosure. The onboard network system 11 is configured including the bus 300, a monitoring ECU 2100 and ECUs 200a through 200d and so forth, connected to the bus 300, as illustrated in FIG. 13. The onboard network system 11 is the same as the onboard network system 10 (see FIG. 1)

according to the first embodiment with regard to points not described here in particular. Components of the onboard network system 11 which are the same as components of the onboard network system 10 are denoted in FIG. 13 with the same reference symbols as in FIG. 1, and description is omitted here.

The monitoring ECU 2100 is a type of ECU serving as an unauthorized control suppression device, and is connected to the bus 300. The monitoring ECU 2100 monitors data frames such as state frames and control frames and so forth flowing over the bus 300, and measures the continuation time of the state of the vehicle. The monitoring ECU 2100 determines whether or not to stop control by a control frame that controls the vehicle, in accordance with the continuation time of the state of the vehicle that has been measured, and suppresses unauthorized vehicle control by invalidating control frames when suppressing.

2.2 Configuration of Monitoring ECU 2100

Figure 14:
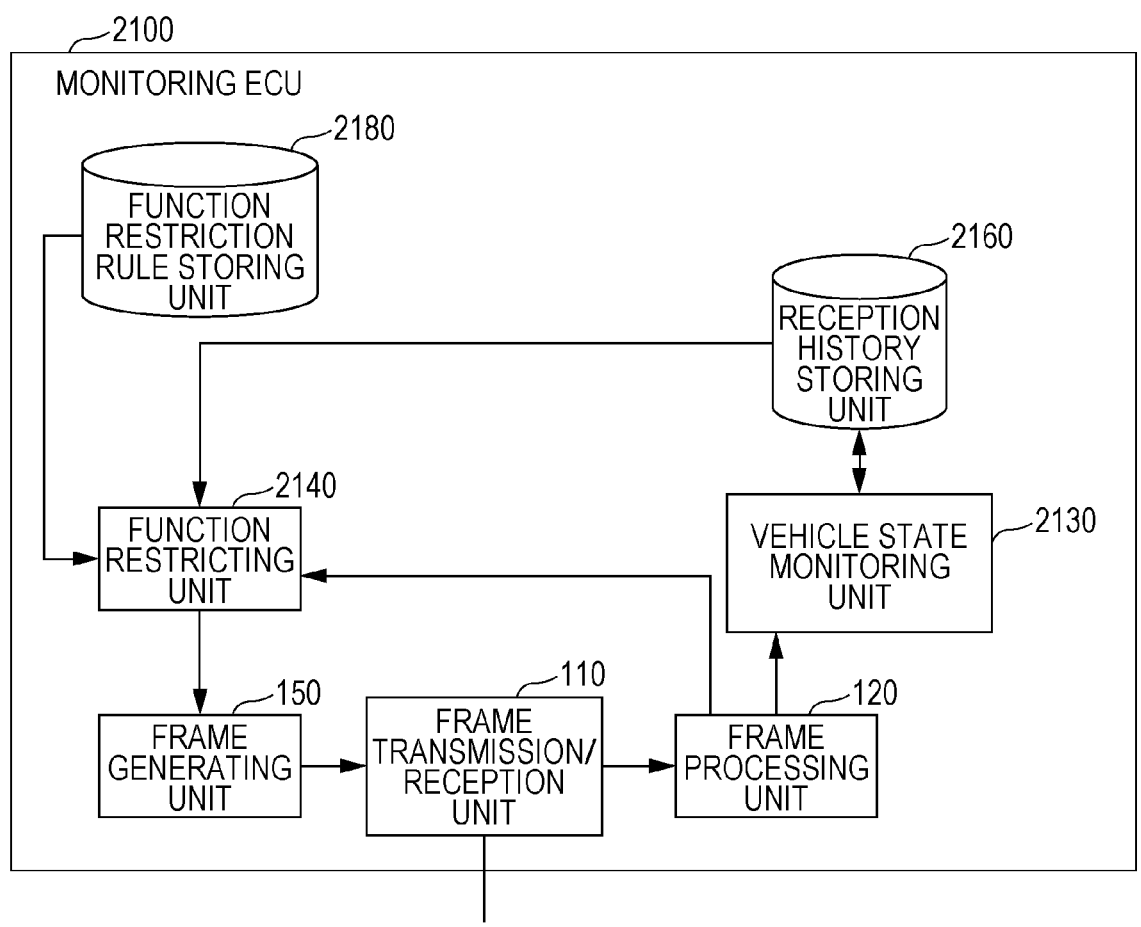
FIG. 14 is a configuration diagram of a monitoring ECU according to the second embodiment.

FIG. 14 is a configuration diagram of the monitoring ECU 2100. The monitoring ECU 2100 includes the frame transmission/reception unit 110, the frame processing unit 120, a vehicle state monitoring unit 2130, a function restricting unit 2140, the frame generating unit 150, a reception history storing unit 2160, and a function restriction rule storing unit 2180. The components of the monitoring ECU 2100 illustrated in FIG. 14 can be realized by a storage medium such as memory or the like of the monitoring ECU 2100, a communication circuit, and a processor or the like that executes programs stored in memory. The monitoring ECU 2100 is the same as the monitoring ECU 100 (see FIG. 4) illustrated in the first embodiment. Unless particular description is made, components of the monitoring ECU 2100 that have the same functions as the monitoring ECU 100 are denoted in FIG. 14 by the same reference symbols as in FIG. 4, and description thereof will be omitted as appropriate.

The frame processing unit 120 notifies the vehicle state monitoring unit 2130 and function restricting unit 2140 of data frames being received. The vehicle state monitoring unit 2130 updates reception history relating to the corresponding ID in the reception history information stored in the reception history storing unit 2160, with regard to the data frame notified from the frame processing unit 120. Specifically, the vehicle state monitoring unit 2130 updates the reception history information based on data values of state frames transmitted from the ECU 200a, ECU 200d, and so forth, and the time at which the state frames were received. In this updating, the vehicle state monitoring unit 2130 obtains the time at which a state frame was received from a timer that counts the amount of time elapsed from the time of activation of the monitoring ECU 2100 for example, or from some other predetermined time, and updates the reception history information so as to indicate information relating to state frames received within the last 100 ms.

When receiving a control frame for controlling the vehicle, the function restricting unit 2140 determines whether or not to suppress control of the vehicle by referencing function restriction rules that are stored in the function restriction rule storing unit 2180 and serve as a reference for whether or not control of the vehicle should be suppressed, and reception history information that the reception history storing unit 2160 stores. In a case of determining that control of the vehicle should be suppressed, the function restricting unit 2140 requests the frame generating unit 150 to transmit an error frame to invalidate the control frame being received for control of the vehicle. Specifically, in order to determine whether or not control of the vehicle should be suppressed, in a case where a control frame is being received that is the object of function restriction in function restriction rules, the function restricting unit 2140 obtains measurement results of continuation time of the state of the vehicle, and determines whether the state of the vehicle indicated by the reception history of state frames in the reception history information is an unstable state that satisfies conditions of vehicle state continuation time in the function restriction rules, or not (i.e., a stable state).

The reception history storing unit 2160 stores reception history of data frames that the monitoring ECU 2100 has received. For example, the reception history storing unit 2160 stores reception history information (see FIG. 15) indicating data values relating to state frames received within the last 100 ms, and the time of reception.

The function restriction rule storing unit 2180 stores function restricting rules (see FIG. 16) serving as a reference for determination whether or not to suppress control by a control frame being received.

2.3 Reception History Information

FIG. 15 illustrates an example of reception history information that the reception history storing unit 2160 stores. In the example in FIG. 15, the reception history information includes the reception time and data values of state frames with the ID "0x100" indicating vehicle speed, and state frames of ID "0x300" indicating gearshift position, that have been received within the last 100 ms.

According to the reception history information in this example, regarding the state frames of ID "0x100" relating to vehicle speed, the data value at the latest reception time is 0.0 km/h, and the reception time is 211 ms. At the reception time one time back, the data value of the state frame for vehicle speed is 42.1 km/h, and the reception time is 210 ms. At the reception time two times back, the data value of the state frame for vehicle speed is 42.0 km/h, and the reception time is 160 ms. Regarding the state frames of ID "0x300" relating to gearshift position, the data value at the latest reception time indicates "reverse", and the reception time is 201 ms. At the reception time one time back, the data value indicates "drive", and the reception time is 200 ms. At the reception time two times back, the data value indicates "drive", and the reception time is 150 ms.

2.4 Function Restricting Rules

FIG. 16 illustrates an example of function restricting rules that the function restriction rule storing unit 2180 stores. The function restricting rules are information indicating a reference for whether or not control of the vehicle should be suppressed. In the example in FIG. 16, the object of function restriction that is information identifying control frames performing control of the vehicle, and conditions of vehicle state (specifically, conditions of vehicle state continuation time) serving as a reference, have been correlated. In FIG. 16, an example is illustrated where the function restricting rules are configured of rules of multiple items, but the number of items of the rules may be one or multiple.

In this example, the function that is the object of restriction of rule No. 1 is data frames of which the control flag included in data frames of ID "0x200" regarding steering wheel control instruction is 1 (i.e., control frames relating to steering wheel control instruction), and the conditions for vehicle state to determine that steering wheel control should be suppressed is that the speed of the vehicle relating to state frames of ID "0x100" regarding vehicles state is an unstable state. In the example in FIG. 16, an unstable state relating to vehicle speed means a state where the continuation time of the vehicle speed being 10 km/h or lower is shorter than 60 ms. If the continuation time of the vehicle speed being 10 km/h or lower is 60 ms or longer, the state is a stable state.

That is to say, if one or more state frames indicating a vehicle speed greater than 10 km/h is received between the current time to 60 ms back, determination is made by the function restricting unit 2140 that control by the control frame relating to steering wheel control instruction, which is the object of function restriction, should be suppressed, since conditions of vehicle state continuation time according to rule No. 1 have been satisfied.

Figure 17:
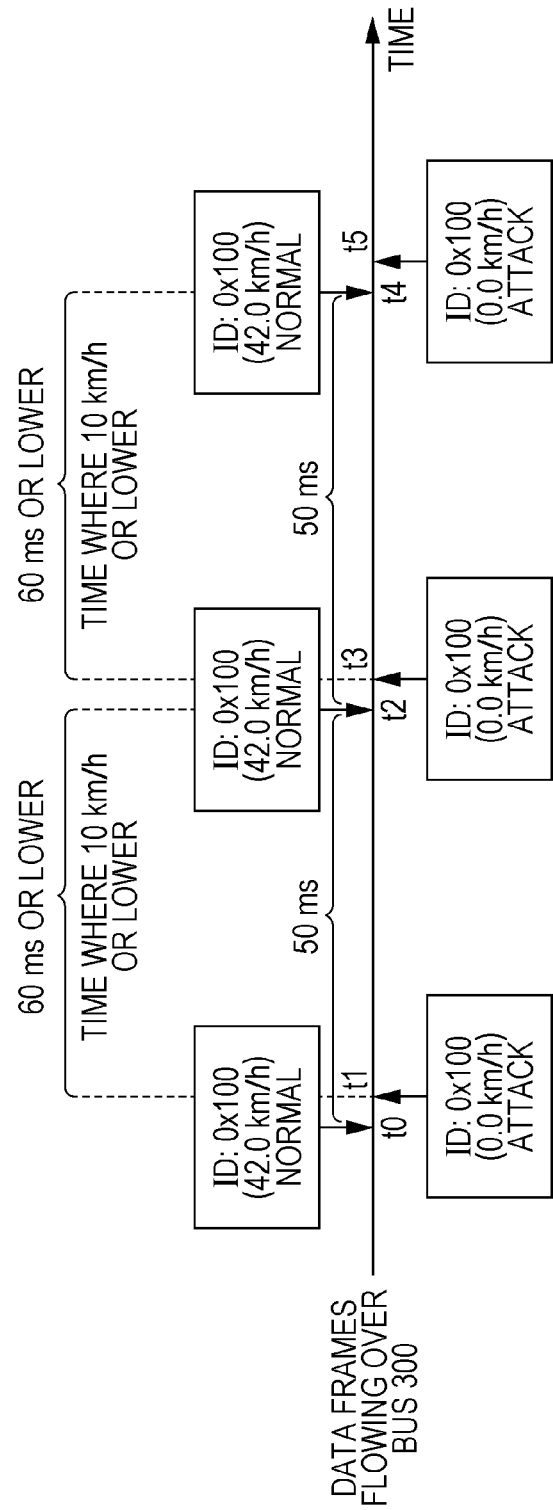
FIG. 17 is a diagram for describing continuance time of vehicle state in a case of having been subjected to an attack that counterfeits a vehicle state.

In the example in FIG. 16, the rule of the item of rule No. 2 is that the state of the vehicle relating to state frames of ID "0x300" regarding gearshift position is an unstable state. In the example in FIG. 16, an unstable state regarding gearshift position means a state where the continuation time of the gearshift position being in "reverse" is shorter than 60 ms. If one or more state frame indicating a gearshift position other than "reverse" is received between 60 ms ago up to the current time, determination is made by the function restricting unit 2140 that control by the control frame relating to steering wheel control instruction, which is the object of function restriction, should be suppressed, since conditions of vehicle state continuation time according to rule No. 2 have been satisfied. Note that it is useful for the conditions for the vehicle state continuation time to be set taking into consideration transmission intervals and the like that have been stipulated beforehand regarding the state frame that is the object. In a case where the transmission interval of state frames is 50 ms for example, and the continuation time serving as a condition for vehicle state continuation time is 60 ms, at least one data frame will be received within the 60 ms. Even if an attacker transmits a state frame indicating information counterfeiting the state of the vehicle such as vehicle speed or the like, reception of a normal state frame resets the vehicle state continuation time to 0. Accordingly, the state of the vehicle such as vehicle speed or the like cannot be counterfeited over a long continuation timer exceeding 60 ms to realize a stable state where function restriction would be disengaged. FIG. 17 illustrates continuation time of the state of the vehicle in a case where an attack has been performed, in which a counterfeited frame counterfeiting the state of the vehicle regarding vehicle speed has been transmitted. In FIG. 17, state frames indicating counterfeit vehicle speed of 0.0 km/h are transmitted at times t1, t3, and t5, immediately after transmission of state frames indicating normal vehicle speed (e.g., 42.0 km/h) that the ECU 200a periodically transmits at times t0, t2, t4, and so forth. The time over which the vehicle speed is 10 km/h or lower indicated by the state frame transmitted in sequence is shorter than 60 ms. When receiving control frames relating to steering wheel control instruction in a case where an attack is being carried out this way, the function restricting unit 2140 follows the rule of the item of rule No. 1 in FIG. 16 and performs a transmission request to the frame generating unit 150 for an error frame to invalidate the control frame relating to steering wheel control instruction, since the state of the vehicle is not in a stable state in the period of the past 60 ms, for example.

Note that the onboard network system 11 is designed such that data frames having the ID "0x200" and the control frag is 1 (i.e., control frames relating to steering wheel control instruction) only flow onto the bus 300 when the vehicle speed is 10 km/h or lower and the gearshift position is "reverse". After the driver has performed an operation to start execution of the parking support function and performed an operation to specify a parking space, a control frame regarding steering wheel control instruction is sent onto the bus 300. It is thought that several seconds will elapse from the driver stopping the vehicle, changing the gearshift position to "reverse", and requesting starting of executing of the parking support function by operating the monitor 230 and specify a parking position. In a case where the parking support function is used in a normal way, a vehicle state where the vehicle speed is 10 km/h or lower and the gearshift position is "reverse" has continued longer than 60 ms when a normal data frame that is the object of function restriction (i.e., a control frame relating to steering wheel control instruction) is transmitted. Accordingly, determination will not be made by the function restricting unit 2140 that control of the steering wheel by the normal control frame should be suppressed. Thus, when receiving a control frame relating to the steering wheel control instruction in a case where there is no attack and the parking support function has been used in a normal way, the state of the vehicle is in a stable state where the vehicle speed of 10 km/h or lower and the gearshift position of "reverse" continue for the period of the last 60 ms, so not transmission is made to request an error frame.

2.5 Sequence Regarding Suppression of Attack on Parking Support Function

Figure 18:
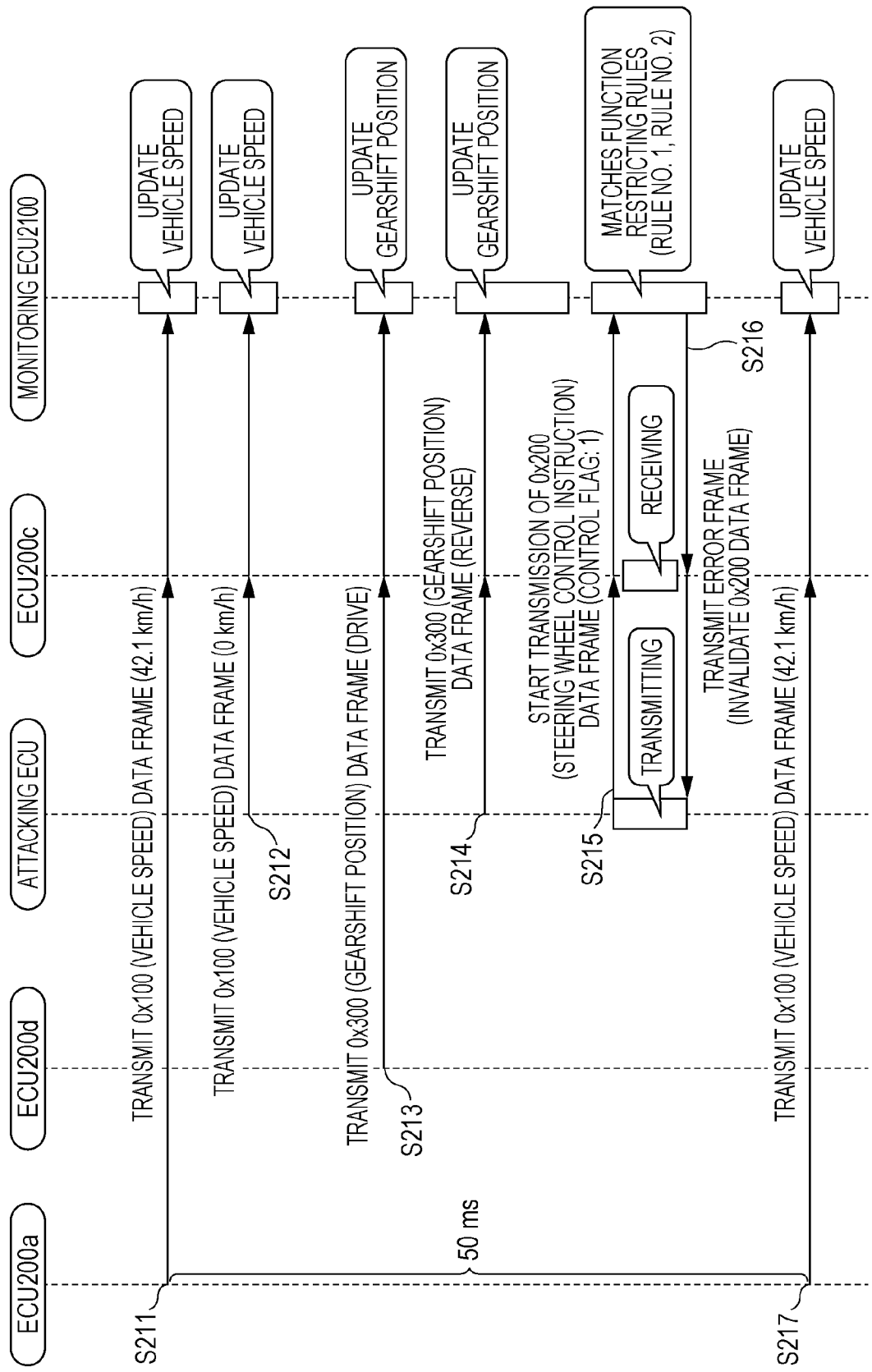
FIG. 18 is a diagram illustrating a sequence of an attack on the parking support function and unauthorized control suppression according to the second embodiment.

FIG. 18 illustrates an example of a sequence relating to an attack on the parking support function, and unauthorized control suppression processing by the monitoring ECU 2100. The monitoring ECU 2100 here stores the function restricting rules exemplified in FIG. 16. Also, an assumption will be made that an operation has not been made to start execution of the parking support function, and the vehicle is traveling forward.

The ECU 200a transmits a state frame indicating vehicle speed (i.e., a data frame having the ID "0x100") to the bus 300 (step S211). In this example, the current vehicle speed is 42.1 km/h. the ECU 200c that has received the state frame regarding vehicle speed, transmitted in step S211, updates the stored current vehicle speed to 42.1 km/h. The monitoring ECU 2100 that has received that state frame updates the reception history regarding vehicle speed in the reception history information stored in the reception history storing unit 2160.

In order for the ECU 200c to control the steering wheel 240, the condition of vehicle speed of 10 km/h or lower needs to be satisfied. Accordingly, the attacking ECU transmits a data frame having the ID "0x100" and indicating false information that the vehicle speed is 0 km/h, i.e., a state frame indicating false information regarding vehicle speed, as a preparatory stage to unauthorizedly controlling the steering wheel 240 (step S212). The ECU 200c that has received the state frame indicating the false information regarding vehicle speed that has been transmitted in step S212 updates the current vehicle speed stored therein to 0 km/h. The monitoring ECU 2100 that has received the state frame also updates the reception history regarding the vehicle speed in the reception history information.

The ECU 200d transmits a state frame indicating the gearshift position (i.e., data frame having ID "0x300") to the bus 300 (step S213). In this example, the current gearshift position is "drive". The ECU 200c that has received the state frame relating to gearshift position that has been transmitted in step S213 updates the stored current gearshift position to "drive". The monitoring ECU 2100 that has received the state frame updates the reception history regarding the gearshift position in the reception history information.

In order for the ECU 200c to control the steering wheel 240, the condition of gearshift position of "reverse" needs to be satisfied. Accordingly, the attacking ECU transmits a data frame having the ID "0x300" and indicating false information that the gearshift position is "reverse", i.e., a state frame indicating false information regarding gearshift position, as a preparatory stage to unauthorizedly controlling the steering wheel 240 (step S214). The ECU 200c that has received the state frame indicating the false information regarding gearshift position that has been transmitted in step S214 updates the current gearshift position stored therein to "reverse". The monitoring ECU 2100 that has received the state frame also updates the reception history regarding the gearshift position in the reception history information.

Next, in order to unauthorizedly control the steering wheel 240, the attacking ECU transmits a data frame having the ID "0x200" and the control flag set to 1 (i.e., a control frame regarding steering wheel control instruction) (step S215). In response to this, the monitoring ECU 2100 determines whether or not control of the vehicle should be suppressed based on the function restricting rules, while receiving that control frame.

The control frame transmitted in step S215 matches the object of function restriction of the rule of the item of rule No. 1 in the function restricting rules, and the condition of the corresponding vehicle state continuation time is satisfied, so the monitoring ECU 2100 determines that control of the vehicle by that control frame should be suppressed. This control frame also matches the object of function restriction of the rule of the item of rule No. 2 in the function restricting rules, and the condition of the corresponding vehicle state continuation time is satisfied, so the monitoring ECU 2100 can also make determination thereby that control of the vehicle by that control frame should be suppressed. If the state of the vehicle in the predetermined period indicated by the reception history information falls under a condition of vehicle state continuation indicated by the rule of at least one item in the function restricting rules, the monitoring ECU 2100 can determine that control of the vehicle by the control frame that is the object of function restriction in this relevant rule should be suppressed.

The monitoring ECU 2100 has determined that control of the vehicle by that control frame should be suppressed while receiving the control frame transmitted in step S215, and accordingly transmits an error frame to invalidate the control frame regarding steering wheel control instruction (step S216). The monitoring ECU 2100 can suppress unauthorized control of the steering wheel 240 by an attack, by transmitting an error frame. The data frame having the ID "0x200" that was being transmitted is overwritten by this error frame, and consequently, transmission of the data frame by the attacking ECU is interrupted. The ECU 200c discards the data frame being received by receiving the error frame, and does not control the steering wheel 240 based on that data frame.

Thus, the monitoring ECU 2100 performs error frame transmission in accordance with determination results based on the function restricting rules, and thereby can block the ECU 200c from receiving data frames to unauthorized control the steering wheel 240 by the attacking ECU.

The ECU 200a transmits a state frame indicating vehicle speed of 42.1 km/h to the bus 300 (step S217). The ECU 200c that has received the state frame relating to vehicle speed transmitted in step S217 updates the stored current vehicle speed to 42.1 km/h. The monitoring ECU 2100 that has received that state frame also updates the reception history regarding the vehicle speed in the reception history information in the reception history storing unit 2160.

2.6 Monitoring Operations by Monitoring ECU 2100

Figure 19:
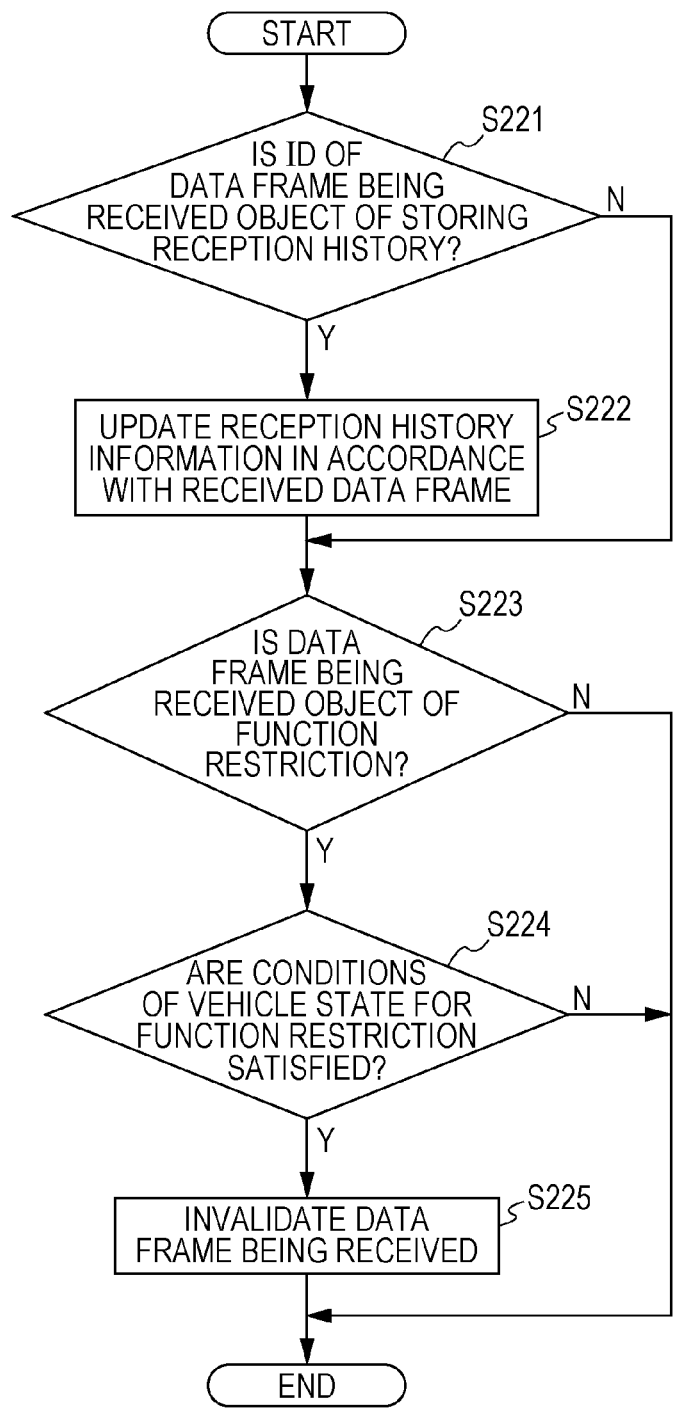
FIG. 19 is a flowchart illustrating an example of monitoring operation by the monitoring ECU according to the second embodiment.

FIG. 19 is a flowchart illustrating an example of monitoring operations by the monitoring ECU 2100. Processing relating to these monitoring operations is performed each time a data frame appears on the bus 300. The monitoring ECU 2100 receives a data frame, and judges whether or not the ID of the data frame being received is an ID of a data frame regarding which reception history should be stored in the reception history storing unit 2160 (step S221). For example, the IDs that are the object of storing reception history are the ID "0x100" of state frames regarding vehicle speed and ID "0x300" of state frames regarding gearshift position (see FIG. 15).

In a case where the ID of the data frame being received is an ID of a data frame of which reception history should be stored in the reception history storing unit 2160, the monitoring ECU 2100 updates the reception history regarding that ID in the reception history information stored in the reception history storing unit 2160, so as to include the data value indicating the vehicle speed and so forth, and the reception time, of the data frame being received (step S222). Note that at the time of updating this reception history information, the monitoring ECU 2100 may delete information of reception history of which the reception time is earlier than a predetermined amount of time (e.g., 100 ms) from the current time.

After having judged in step S221 that the ID of the data frame being received is not an ID of a data frame that should be stored in the reception history in the reception history storing unit 2160, or after the processing of step S222, the monitoring ECU 2100 judges whether or not the data frame being received is a control frame that is the object of function restriction in the function restricting rules stored in the function restriction rule storing unit 2180 (step S223). In a case of judging in step S223 that the data frame being received is not a control frame that is the object of function restriction, the monitoring ECU 2100 ends the processing.

In a case of having judged in step S223 that the data frame being received is a control frame that is the object of function restriction, the monitoring ECU 2100 determines whether or not control of the vehicle relating to that control frame should be suppressed, by verifying whether or not the state of the vehicle has been an unstable state in the last period, based on the function restricting rules (step S224). Specifically, the monitoring ECU 2100 performs this determination by verifying whether the conditions of the vehicle state continuation time corresponding to the object of function restriction matching the control frame being received are satisfied, in the rules of each item in the function restricting rules, by referencing the reception history of state frames relating to the corresponding vehicle state stored in the reception history storing unit 2160, and the current time. If conditions of vehicle state continuation period are not satisfied regarding any of the rules of the items in the function restricting rules, as a result of the verification regarding whether or not conditions of vehicle state continuation time in the function restricting rules are satisfied, the monitoring ECU 2100 ends the processing.

If vehicle state continuation time conditions in the function restricting rules are satisfied as the result of verification in step S224, an error frame is transmitted to the bus 300 before the tail end of the data frame that is a control frame being received is received, to invalidate the control frame being received in order to suppress control of the vehicle by the control frame being received (step S225). Accordingly, the data frame being received is overwritten by the error frame, and this data frame is invalidated. Accordingly, ECUs connected to the bus 300 (e.g., the ECU 200c) do not perform control of the vehicle based on the invalidated data frame.

2.7 Advantages of Second Embodiment

In the onboard network system 11 according to the second embodiment, the monitoring ECU 2100 verifies whether or not the data value of a particular state frame indicating the state of the vehicle is a certain value or within a certain range, based on a set of state frames received in a certain period, i.e., whether or not a stable state. The particular state frame is set corresponding to a control frame that performs control of the vehicle, which is set as being the object of function restriction. This verification is performed according to whether or not the continuation time of the data value of the particular state frame being the certain value or within the certain range, based on the function restricting rules illustrated in FIG. 16, for example. In a case where the state of the vehicle indicated by the particular state frame is not a stable state for a certain period (i.e., a case where the state does not continue within the certain period) when a control frame for controlling the vehicle is being transmitted, that control frame is invalidated, thereby suppressing control of the vehicle. It is useful to set the length of this certain period to be longer than the transmission interval of the state frame that is stipulated beforehand. Accordingly, even if an attacker counterfeits the state of the vehicle and transmits a control frame that would cause unauthorized control, the monitoring ECU 2100 invalidates that control frame due to the shortness of continuation time of the state of the vehicle. It is further useful to set vehicle state continuation time serving as a condition for invalidating a data frame that is an object of function restriction, taking into consideration a case of using the function normally. Accordingly, data frames that are the object of function restriction are not invalidated when using functions in a normal manner, and invalidation of only data frames from an attacker that cause unauthorized control can be realized.

This monitoring ECU 2100 enables prevention of attacks where the state of the vehicle is counterfeited and the vehicle is unauthorizedly controlled, thereby securing security of the onboard network. The unauthorized control suppression method for this prevention can be realized by disposing the monitoring ECU 2100 on the onboard network, so the onboard network can be protected with suppressed costs.

Third Embodiment

An onboard network system 12 that is a partial modification of the onboard network system 10 according to the first embodiment will be described. The monitoring ECU in the onboard network system 12 according to the present embodiment monitors state frames flowing over the onboard network system, measures change in the state of the vehicle, and restricts control functions by control frames controlling the vehicle, based on a reference regarding whether or not the vehicle state is in a frequent-change-occurrence state where change occurs more than a predetermined number of times over a certain period. Whether or not in a frequent-change-occurrence state can be distinguished by observing the time over which change of a predetermined amount or more continues, and so forth, besides observing the number of times of change of a predetermined amount or more occurs in data values indicated by data frames. As a specific example, in a case where a frequent-change-occurrence state occurs due to continuation of an inconsistent state where control instructions are not consistent regarding a data frame that is a state frame indicating a control instruction state, such as whether in a cruise control mode or not, for example, and the control instruction of that data frame is a particular instruction, the monitoring ECU suppresses control by that instruction. The data frame indicating this particular instruction also is a state frame indicating the state of a control instruction and a control frame instructing control of the vehicle. The monitoring ECU can invalidate control frames based on the amount of time over which an inconsistent state continues.

3.1 Overall Configuration of Onboard Network System 12

Figure 20:
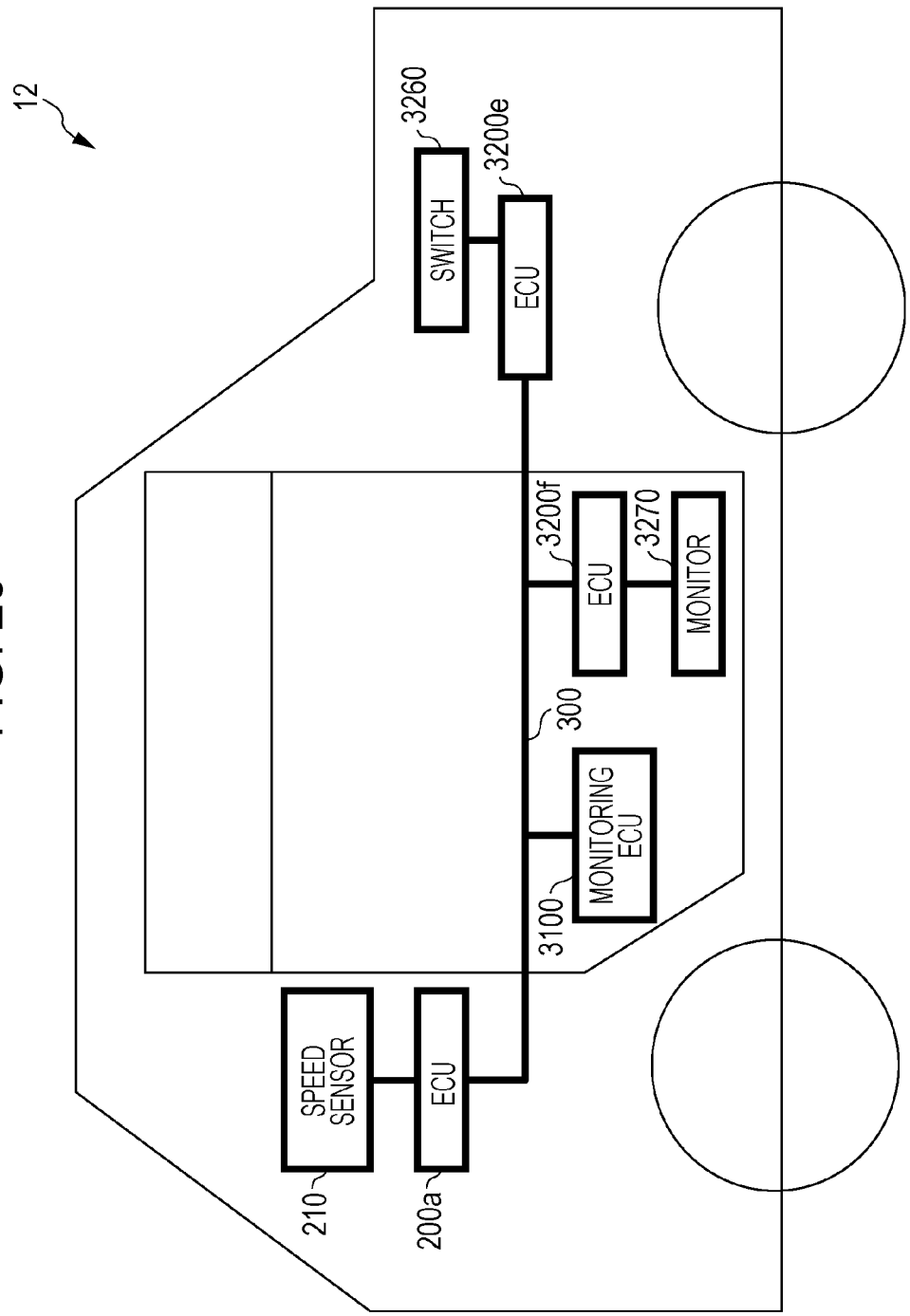
FIG. 20 is a diagram illustrating the overall configuration of an onboard network system according to a third embodiment.

FIG. 20 is a diagram illustrating the overall configuration of the onboard network system 12 according to the present embodiment. The onboard network system 12 is configured including the bus 300, a monitoring ECU 3100 and ECUs 200a, 3200e, and 3200f, and so forth, connected to the bus 300, as illustrated in FIG. 20. A cruise control function is realized in the vehicle in which the onboard network system 12 is installed, by multiple ECUS communicating and cooperating. The onboard network system 12 is the same as the onboard network system 10 (see FIG. 1) in the first embodiment with regard to points not described here in particular. Components of the onboard network system 12 which are the same as components of the onboard network system 10 are denoted in FIG. 20 with the same reference symbols as in FIG. 1, and description is omitted here.

The monitoring ECU 3100 is a type of ECU serving as an unauthorized control suppression device, and is connected to the bus 300. The monitoring ECU 3100 monitors data frames such as state frames and control frames and so forth flowing over the bus 300, monitors whether or not there is inconsistency in information of control instructions and so forth included in the data frames, and in a case where inconsistency occurs, measures the continuation time of the inconsistency. Here, the state of control instruction such as whether or not in the cruise control mode is taken as a type of information relating to the state of the vehicle, and data frames including control instructions will also be referred to as state frames. In a case where that control instruction is a particular information for control of the vehicle, that data frame is a control frame. The monitoring ECU 3100 determines whether or not control by a control frame that controls the vehicle should be suppressed in accordance with inconsistency continuation time, and in a case where it should be suppressed, suppresses unauthorized vehicle control by invalidating that control frame.

The ECU 3200e and the ECU 3200f are each connected to a switch 3260 and a motor 3270. The ECU 3200e transmits data frames including information relating to cruise control to the bus 300 at 80 ms intervals. The information relating to cruise control includes a flag indicating whether or not the cruise control mode currently is on, and acceleration/deceleration information. In a case of the driver having pressed the switch 3260, the ECU 3200e goes into cruise control mode. The ECU 3200e has acquired the vehicle speed from data frames from the ECU 200a, calculates the magnitude of acceleration so as to maintain the vehicle speed at the point of having gone into the cruise control mode, and includes the acceleration in a data frame and transmits the data frame. The cruise control mode is disengaged by the driver pressing the switch 3260 again, or stepping on the brake or the like. The ECU 3200f controls the motor 3270 to realize traveling functions of the vehicle. The ECU 3200f also receives data frames transmitted from the ECU 3200e, and in a case where the cruise control mode flag has been set, effects control by controlling the motor 3270 based on acceleration information, so that the speed of the vehicle is maintained constant.

3.2 Example of Data Frame Transmitted by ECU 3200e

Figures 21, 22:
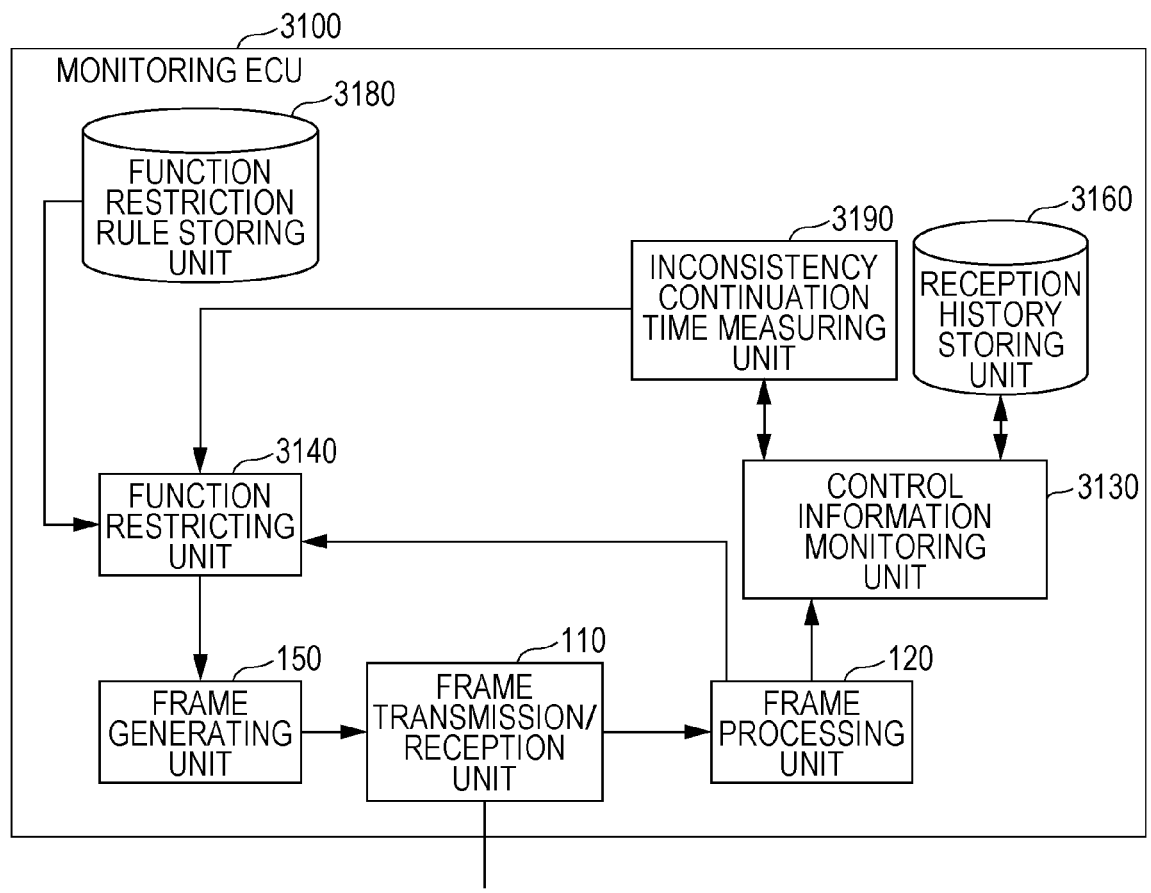
FIG. 21 is a diagram illustrating an example of a data frame that an ECU according to the third embodiment transmits.
FIG. 22 is a configuration diagram of a monitoring ECU according to the third embodiment.

FIG. 21 illustrates an example of a data frame transmitted by the ECU 3200e. This data frame has ID "0x400", the DLC is 3, and the first byte of the data field thereof is a flag indicating whether or not the state of the vehicle is the cruise control mode. If 0, this indicates that the cruise control mode is OFF (i.e., a state where not controlled), and if 1, indicates that the cruise control mode is ON (i.e., a state where controlled). The second byte is a flag indicating whether to accelerate or decelerate when the cruise control mode is ON, 0 indicating acceleration, and 1 indicating deceleration. The third byte is an amount indicating the degree of acceleration/deceleration, represented in increments of 0.01 m/s$^2$. In the example of the data frame in FIG. 21, a data frame is illustrated for the cruise control mode, where acceleration of 0.80 m/s$^2$ is requested. That is to say, this data frame is a state frame indicating that the vehicle is in the cruise control mode, and also is a control frame that request acceleration and controls the vehicle.

3.3 Configuration of Monitoring ECU 3100

FIG. 22 is a configuration diagram of the monitoring ECU 3100. The monitoring ECU 3100 includes the frame transmission/reception unit 110, the frame processing unit 120, the frame generating unit 150, a control information monitoring unit 3130, a function restricting unit 3140, a reception history storing unit 3160, a function restriction rule storing unit 3180, and an inconsistency-continuation-time measuring unit 3190. The components of the monitoring ECU 3100 illustrated in FIG. 22 can be realized by a storage medium such as memory or the like of the monitoring ECU 3100, a communication circuit, and a processor or the like that executes programs stored in memory. The monitoring ECU 3100 is the same as the monitoring ECU 100 (see FIG. 4) illustrated in the first embodiment with regard to points not described here in particular. Components of the monitoring ECU 3100 that have the same functions as the monitoring ECU 100 are denoted in FIG. 22 by the same reference symbols as in FIG. 4, and description thereof will be omitted as appropriate.

The frame processing unit 120 notifies the control information monitoring unit 3130 and function restricting unit 3140 of a data frame being received. The control information monitoring unit 3130 monitors data frames including control instructions, and regarding data frames notified from the frame processing unit 120, updates reception history relating to a corresponding ID in the reception history information that the reception history storing unit 3160 stores. Specifically, the control information monitoring unit 3130 updates the reception history information based on the value of data (e.g., a flag value of a control instruction) of a state frame including a control instruction flag or the like indicating whether the cruise control mode is ON or not, transmitted from the ECU 3200e, and the time at which that state frame was received. Further, the control information monitoring unit 3130 references the reception history information, and judges whether or not an inconsistency is occurring in a state (e.g., cruise control mode) regarding control instructions in a data frame having the same ID received in a certain period. In a case where an inconsistency is occurring in a state relating to control instructions, the control information monitoring unit 3130 requests the inconsistency-continuation-time measuring unit 3190 to start measurement of the inconsistency continuation time.

Such an inconsistency in state regarding control instructions can occur when a function of performing control changes from an OFF state to an ON state, or from an ON state to an OFF state, such as when the driver presses the switch 3260 and turns the cruise control mode ON, for example. However, as long as the function is being used in a normal manner, such an inconsistency will not continue for a long time. The control information monitoring unit 3130 monitors data frames over a certain period, and in a case where there is an inconsistency occurring, requests the inconsistency-continuation-time measuring unit 3190 to measure the continuation time thereof, which is the inconsistency continuation time. In a case where there is no inconsistency occurring, the control information monitoring unit 3130 requests the inconsistency-continuation-time measuring unit 3190 to reset the inconsistency continuation time to 0 and stop measuring.

Upon having received a data frame, the function restricting unit 3140 references function restricting rules stored in the function restriction rule storing unit 3180, and in a case where the data frame being received is a control frame that is the object of function restriction, determines whether or not to suppress control of the vehicle by that control frame. Determination of whether or not to suppress control by that control frame is performed by referencing the inconsistency continuation time measured by the inconsistency-continuation-time measuring unit 3190. In a case of having determined to suppress control of the vehicle, the function restricting unit 3140 requests the frame generating unit 150 to transmit an error frame to invalidate the control frame for vehicle control being received. Specifically, in a case where a control frame that is the object of function restriction in the function restricting rules is being received, the function restricting unit 3140 determines whether or not a type of frequent-change-occurrence state is occurring where the inconsistency continuation time satisfies the function restricting rules, in order to determine whether or not to suppress control of the vehicle.

The reception history storing unit 3160 stores reception history of the data frames that the monitoring ECU 3100 has received. For example, the reception history storing unit 3160 stores reception history information (see FIG. 23) indicating data values regarding state frames, such as data frames or the like including control instruction flags for the cruise control mode, and the time of reception, received in the last 100 ms.

The function restriction rule storing unit 3180 stores function restricting rules (see FIG. 24) serving as a determination reference regarding whether or not to suppress control by the control frame being received. The function restricting rules can be said to be determination references regarding whether or not to invalidate the data frame being received.

The inconsistency-continuation-time measuring unit 3190 measures the amount of time of continuation in inconsistency in control instructions, for each control instruction, and stores measurement-related information (see FIG. 25) such as measurement results or the like. The inconsistency-continuation-time measuring unit 3190 also receives a measurement start request from the control information monitoring unit 3130 and updates the value of a during-measurement flag that serves as measurement-related information. The inconsistency-continuation-time measuring unit 3190 stores a timer that can start or reset (i.e., stop) measuring of inconsistency continuation time in accordance with the during-measurement flag.

3.4 Reception History Information

FIG. 23 illustrates an example of reception history information that the reception history storing unit 3160 stores. In the example in FIG. 23, this includes the value of the control instruction flag serving as a data value of the data frame of ID "0x400" received in the last 100 ms, and the reception time thereof.

According to this reception history information, data frames having the ID "0x400" have been received four times in the last 100 ms, and the value of the flag in the newest reception is 1 (i.e., meaning that the cruise control mode is in an ON state, and that control will be performed), and the time of reception is 301 ms. In the reception one time back, the value of the flag was 0 (i.e., meaning that the cruise control mode is in an OFF state, and that control will not be performed), and the time of reception is 300 ms. In the reception two times back, the value of the flag was 1, and the time of reception was 221 ms. In the reception three times back, the value of the flag was 0, and the time of reception was 220 ms.

3.5 Function Restricting Rules

FIG. 24 illustrates an example of function restricting rules that the function restriction rule storing unit 3180 stores. The function restricting rules are information indicating a reference of whether or not control of the vehicle should be suppressed, and in the example in the FIG. 24, is a correlation between the object of function restriction and restricted functions that is information for identifying control frames that control the vehicle, and conditions of the vehicle state serving as a reference (specifically, conditions of inconsistency continuation time). Although an example is illustrated in FIG. 24 where the function restricting rules are configured of a rule of one item, but the number of items of the rules may be one or multiple. A restricted function indicates a particular control instruction that is restricted in a case where conditions of the inconsistency continuation time are satisfied. If the restricted function is "restricted", this means that in a case where the conditions of inconsistency continuation time are satisfied, and a data frame being received that is the object of function restriction is a control frame having a flag indicating 1, meaning that the cruise control mode is ON, control by that control frame should be suppressed, i.e., that control frame should be invalidated. In a case where the restricted function is "continue", this means that the control frame should be invalidated, so as to maintain the state by control instructions before the inconsistency occurred. For example, in a case where a flag indicating the cruise control mode was 0 before an inconsistency occurred, and conditions of the inconsistency continuation time have been satisfied, control frames that are data frames with the flag indicating the cruise control mode is 1 are invalidated. Conditions of inconsistency continuation time are conditions indicating the length of the inconsistency continuation time, as conditions for function restriction, and in a case where these conditions are satisfied, function restriction is performed regarding data frames that are the object of function restriction. In the example in FIG. 24, the object of function restriction is data frames having the ID "0x400" regarding cruise control, and data frames including control instructions indicating an ON state for the cruise control mode are control frames that should be invalidated. In the example in FIG. 24, the conditions for the inconsistency continuation time are that the inconsistency continuation time is 500 ms or longer. The function restricting rules in the example in FIG. 24 can also be said to be a reference that control by particular control instructions for cruise control should be suppressed in a frequent-change-occurrence state where the inconsistency continuation time regarding the state of cruise control mode control instructions is 500 ms or longer. In this frequent-change-occurrence state, the monitoring ECU 3100 invalidates control frames that are data frames indicating particular control instructions relating to cruise control by transmission of error frames.

3.6 Inconsistency Continuation Time

FIG. 25 illustrates an example of measurement-related information including the inconsistency continuation time that the inconsistency-continuation-time measuring unit 3190 measures and stores, and so forth. The measurement-related information in this example includes, for each data frame ID, inconsistency continuation time that is the amount of time over which the inconsistency regarding the control instructions has continued, a during-measurement flag indicating whether or not the inconsistency continuation time is being measured, and a state before occurrence of inconsistency, indicating whether or not control was being performed before the inconsistency occurred. In this example, with regard to the data frame of ID "0x400" relating to cruise control, the measured inconsistency continuation time is 100 ms, the during-measurement flag is 1 which means that the continuation time is being measured, and the state before the occurrence of the inconsistency is "not controlled" (i.e., the flag for control instructions indicating the cruise control mode was 0).

3.7 Sequence Relating to Suppression of Attack on Cruise Control Function

Figure 26:
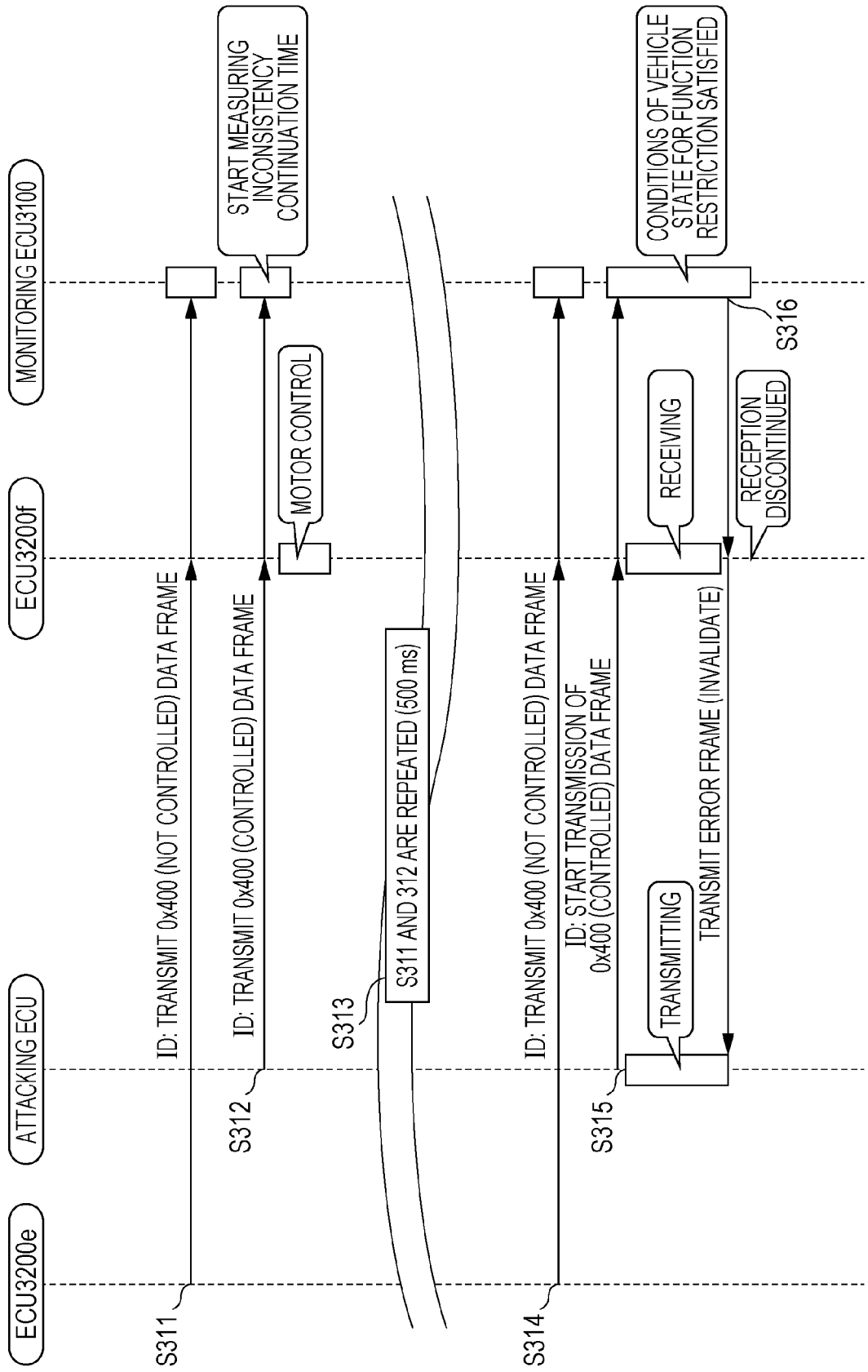
FIG. 26 is a diagram illustrating a sequence of an attack on a cruise control function and unauthorized control suppression according to the third embodiment.

FIG. 26 illustrates an example of a sequence relating to an attack on the cruise control function, and unauthorized control suppression processing by the monitoring ECU 3100. The monitoring ECU 3100 here stores in the function restricting rules exemplified in FIG. 24. An assumption will also be made that the switch 3260 to turn the cruise control function ON has not been operated. Data frames relating to vehicle speed that the ECU 200a transmits are omitted from illustration in FIG. 26.

The ECU 3200e sets the flag for control instructions to 0 in a data frame having the ID "0x400" relating to cruise control, to indicate that the cruise control mode is in an OFF state, and transmits to the bus 300 (step S311). The ECU 3200f and monitoring ECU 3100 receive this data frame. The flag relating to cruise control mode is 0, so the ECU 3200f does not control the motor 3270 for acceleration or deceleration or the like to maintain the vehicle speed constant. The monitoring ECU 3100 updates the reception history information stored in the reception history storing unit 3160 based on the received data frame.

The attacking ECU sets the flag of control instructions to 1 in a data frame having the ID "0x400" relating to cruise control, to indicate that the cruise control mode is in an ON state, and transmits (step S312). The ECU 3200f and monitoring ECU 3100 receive this data frame. The flag relating to the cruise control mode is 1, so the ECU 3200f controls the motor 3270 in accordance with the acceleration value indicating acceleration or deceleration in the data frame. The monitoring ECU 3100 updates the reception history information stored in the reception history storing unit 3160 based on the received data frame. At this time, data frames of both "controlled" relating to cruise control (i.e., control instructions that the cruise control mode is in the ON state) and "not controlled" (i.e., control instructions that the cruise control mode is in the OFF state) have been received within the last 100 ms, so the monitoring ECU 3100 judges this to be an inconsistency, and starts measurement of the inconsistency continuation time.

Thereafter, transmission of data frames having the ID "0x400" and indicating "not controlled" regarding cruise control, the same as in step S311, and data frames having the ID "0x400" and indicating "controlled" regarding cruise control, the same as in step S312, is repeated for 500 ms (step S313).

Next, the ECU 3200e transmits a data frame having the ID "0x400" regarding cruise control and indicating "not controlled" (step S314). The ECU 3200f and monitoring ECU 3100 receive this data frame.

Next, the attacking ECU transmits a data frame having the ID "0x400" and indicating "controlled" (i.e., control instructions that the cruise control mode is in the ON state) (step S315).

In response to the transmission in step S315, in a case where the data frame being received is a control frame identified as being an object of function restriction in the function restricting rules and being a restricted function, the monitoring ECU 3100 determines whether or not to suppress control by that control frame according to whether or not conditions of the vehicle state in the function restricting rules (i.e., conditions of inconsistency continuation time) are satisfied. At this point, a control frame that is a data frame including a control instruction indicating cruise control mode (i.e., the flag is 1) is being received in a state where the inconsistency continuation time has continued for 500 ms or more, so the monitoring ECU 3100 determines that control by that control frame should be suppressed. An error frame is then transmitted to invalidate that control frame (step S316). The monitoring ECU 3100 can suppress unauthorized control relating to cruise control by the attack by transmitting the error frame. This error frame overwrites the control frame having ID "0x400" and including the control instructions indicating that the cruise control mode is ON, which was being transmitted, and a as result, the transmission of the data frame by the attacking ECU is interrupted. By receiving the error frame, the ECU 3200f discards the data frame being received, and control such as acceleration, deceleration, or the like, for cruise control based on that data frame is not performed.

Thus, the monitoring ECU 3100 transmits an error frame in accordance with determination results based on the function restricting rules, so the ECU 3200f can be suppressed from receiving the data frame for performing unauthorized control regarding cruise control by the attacking ECU.

3.8 Monitoring Operations by Monitoring ECU 3100

Figure 27:
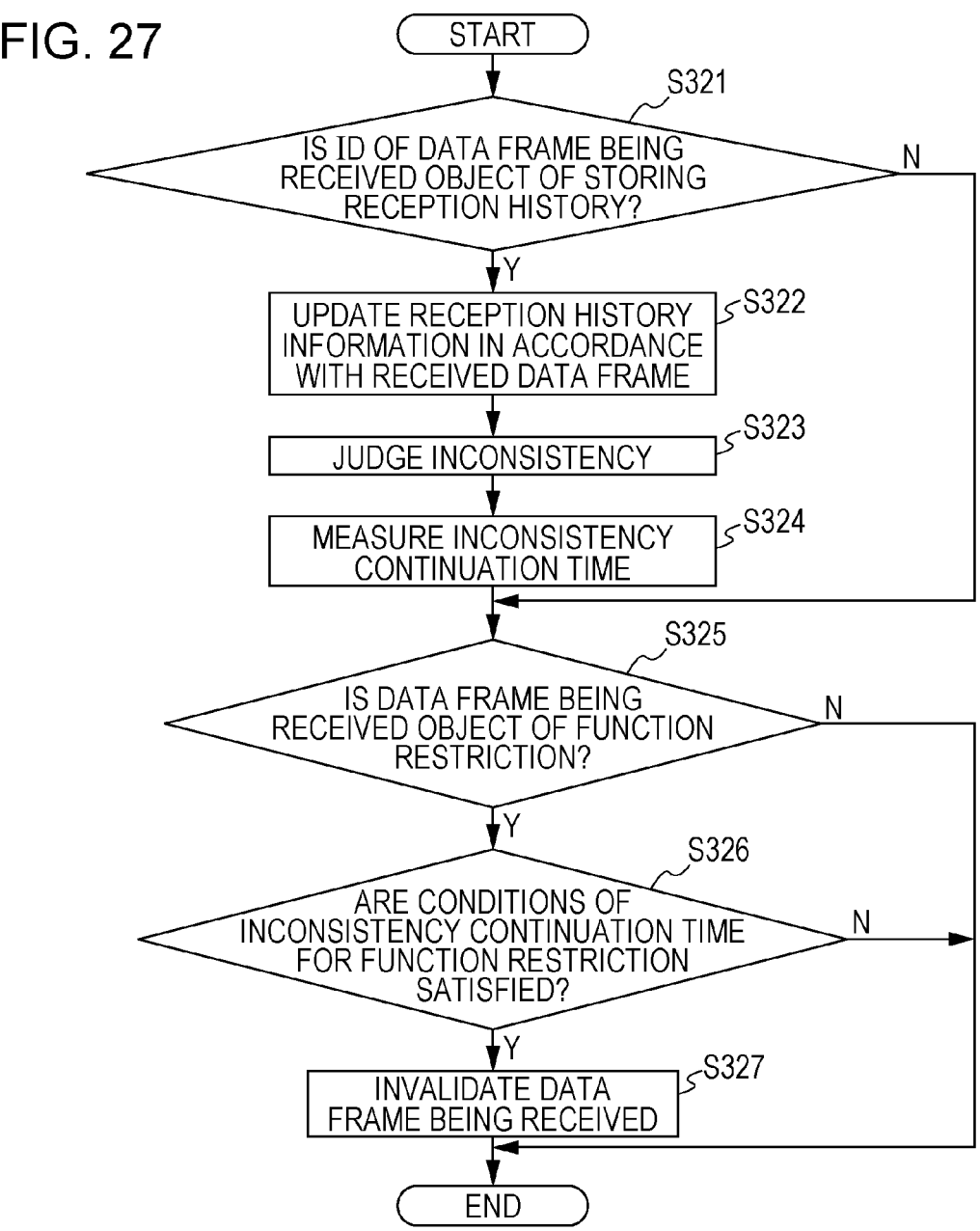
FIG. 27 is a flowchart illustrating an example of monitoring operation by the monitoring ECU according to the third embodiment.

FIG. 27 is a flowchart illustrating an example of monitoring operations by the monitoring ECU 3100. This processing relating to monitoring operations is performed each time a data frame appears on the bus 300.

The monitoring ECU 3100 receives a data frame, and judges whether or not the ID of the data frame being received is an ID of a data frame regarding which reception history should be stored in the reception history storing unit 3160 (step S321). For example, an ID that is the object of storing reception history is the data frame ID "0x400", which is a state frame regarding the state of the cruise control mode (see FIG. 23).

In a case where the ID of the data frame being received is an ID of a data frame regarding which the reception history should be stored in the reception history storing unit 3160, the monitoring ECU 3100 updates the reception history regarding that ID in the reception history information stored in the reception history storing unit 3160, such that the data value indicating the state in the data frame being received (e.g., the flag for control instruction relating to the cruise control mode), and the time of reception, are included (step S322). Note that when updating this reception history information, the monitoring ECU 3100 may delete information of reception history of which the reception time is earlier than a predetermined amount of time (e.g., 100 ms) from the current time.

Next, the monitoring ECU 3100 judges whether or not an inconsistency is occurring in data values indicating control instructions or the like, based on the reception history information (step S323).

Next, the monitoring ECU 3100 causes the inconsistency-continuation-time measuring unit 3190 to start or stop measuring inconsistency continuation time, based on whether or not there is an inconsistency, as judged in step S323 (step S324).

After having judged in step S321 that the ID of the data frame being received in step S321 is not an ID of a data frame that should be stored in the reception history storing unit 3160, or after the processing of step S324, the monitoring ECU 3100 judges whether or not the data frame being received is a control frame identified as being an object of function restriction in the function restricting rules stored in the function restriction rule storing unit 3180 and being a restricted function (step S325). In a case of judging in step S325 that the data frame being received is not a control frame that is the object of function restriction, the monitoring ECU 3100 ends the processing.

Next, the monitoring ECU 3100 determines whether or not control by the control frame being received should be suppressed, based on whether or not the inconsistency continuation time measured by the inconsistency-continuation-time measuring unit 3190 satisfies conditions of inconsistency continuation time in the function restricting rules (step S326). If conditions of the vehicle state regarding inconsistency continuation time are satisfied, determination is made that control by that control frame should be suppressed. In a case where determination is made that control by that control frame should not be suppressed, i.e., in a case where the conditions of inconsistency continuation time are not satisfied, the monitoring ECU 3100 ends the processing.

In a case of having determined in step S326 that control by that control frame should be suppressed, the monitoring ECU 3100 transmits an error frame to the bus 300 before the tail end of the data frame that is a control frame being received is received, to invalidate the control frame (step S327). Accordingly, the data frame being received is overwritten by the error frame, and this data frame is invalidated. Accordingly, ECUs connected to the bus 300 (e.g., the ECU 32000 do not perform control of the vehicle based on the invalidated data frame.

3.9 Advantages of Third Embodiment

In the onboard network system 12 according to the third embodiment, the monitoring ECU 3100 verifies whether or not the state is a frequent-change-occurrence state, where change in state of control instructions frequently occurs, based on a set of state frames relating to control instructions received during a certain period. This verification is performed according to whether or not inconsistency continuation time, which is time over which inconsistency in change of state continues, based on the function restricting rules illustrated in FIG. 24, for example. The monitoring ECU 3100 then determines whether or not to invalidate the control frame identified as being an object of function restriction in the function restricting rules and being a restricted function, in accordance with the inconsistency continuation time. Accordingly, even if an attacker continues to transmit data frames causing unauthorized control, unauthorized control cannot be continuously caused. This is a valid measure where data frames relating to control, which could cause great damage if unauthorized control is continued, are made to be the object of monitoring. Also, according to the monitoring ECU 3100, when specific functions such as cruise control functions or the like, for example, are in normal use, and change in state of the control instructions occur now and then (i.e., inconsistency continuation time is a predetermined amount of time or less), the control is not suppressed, and in a case of an attack where the change occurs frequently in a predetermined period, the control is suppressed. Thus, normal data frames are not erroneously invalidated.

Other Embodiments

The first through third embodiments have been described above as examples of technology relating to the present disclosure. However, technology relating to the present disclosure is not restricted to this, and is applicable to embodiments where modifications, substitutions, addition, omission, and so forth have been made as appropriate. For example, the following modifications are also included in an embodiment of the present disclosure.

(1) Although the state counterfeit detecting unit, function restricting unit, vehicle state monitoring unit, and control information monitoring unit have been described as components of the monitoring ECU connected to the bus 300 for multiple ECUs to exchange frames, these may be components of one or multiple other ECUs. The above-described monitoring ECU does not have to be a monitoring-specific ECU as long as it is an ECU connected to the bus in the onboard network system, and may also have functions different from monitoring and handling. Also, one or more components of the monitoring ECU may be relocated to another ECU. Any ECU may perform detection of a counterfeited state, detection of control frames regarding which control should be suppressed based on function restricting rules, invalidation of control frames to suppress control, and so forth. For example, a configuration may be made where and ECU or the like that receives a control frame and performs control in accordance with the content of the control frame has the same components as the monitoring ECU described above. For example, a gateway ECU that performs transfer of data frames among buses in a case where the onboard network is configured of multiple buses may include the components of the monitoring ECU described above. This is useful, since the gateway ECU can monitor the states of the buses. This gateway ECU including the configuration of the monitoring ECU can perform processing to suppress transfer among buses of control frames regarding which determination has been made that control should be suppressed or the like, besides invalidation of control frames by error frames to suppress control by unauthorized control frames. Also, a gateway ECU can monitor information of a great number of onboard networks, so a broader range of functions can be realized to suppress control by unauthorized control frames.

(2) The control frames in the above-described embodiments may be any sort of frame, as long as they are data frames including information used in control of the vehicle. Control frames may also be deemed to include data frames giving suppression instructions regarding control of the vehicle, for a type of control that is to suppress control of the vehicle.

(3) An example has been described in the above embodiments where the monitoring ECU overwrites and invalidates a control frame being received in a bus by an error frame, as an example of suppressing control by a control frame that is an object of function restriction. However, the method of realizing suppression of control by a control frame is not restricted to the method of transmitting an error frame while the control frame is being received. For example, suppression of control by a control frame may be realized by the ECU that receives the control frame and performs control in accordance with the content of that control frame, discarding the control frame regarding which determination has been made that control should be suppressed due to being the object of function restriction, without performing control corresponding to that control frame. This is useful in cases where a monitoring ECU dedicated to monitoring is not included in the configuration of the onboard network. Also, suppression of control by the control frame may be realized by a gateway ECU suppressing transfer of a control frame regarding which determination has been made that control should be suppressed, as described above. Examples of methods for realizing suppression of control by a control frame also include a method of transmitting a data frame to other ECUs, notifying that functions relating to that control are to be restricted, a method of notifying the user that the functions are to be restricted, a method of transitioning the vehicle to a fail-safe mode that has been set beforehand, which can include limitation of automatic control functions such as advanced driver-assistance system (ADAS) functions and so forth.

(4) Although data frames in the CAN protocol are described in a standard ID format in the above embodiments, this may be the extended ID format, and IDs that are identifiers of data frames may be extended IDs in the extended ID format, or the like.

(5) Although an example has been described in the above embodiments where the monitoring ECU stores reception history information including information of data frames received in the last 100 ms in the reception history storing unit, 100 ms is only an example of a storing period from reception of the information. It is sufficient to set a minimal amount of time where information necessary to determine whether the state of the vehicle has been counterfeited, or a minimal amount of time where information necessary to judge that inconsistency of information relating to control instructions is continuing. For example, setting an optional period longer than the transmission interval of data frames is assumed as a measure. Also, the number of IDs of data frames that are the object of reception history being recorded as reception history information may be one or multiple. The number of items in the function restricting rules that the monitoring stores may be one or multiple. The vehicle state information that the monitoring ECU stores in the vehicle state storing unit may include a counterfeit flag relating to one ID, or may include counterfeit flags relating to each of multiple IDs.

(6) Although the monitoring ECU stores the reception history including data values of the data field of data frames, and the time of reception, as reception history information in the reception history storing unit in the above-described embodiments, data values and time of reception are only an example, and storing of data values or reception time may be omitted. The reception history storing unit may store other information, or may store part of data values of the data field, or may store the content of all fields of received data frames.

(7) Although conditions of vehicle state continuation time relating to vehicle speed and conditions of vehicle state continuation time relating to gearshift position have been given in the above-described embodiments as references indicated by the function restricting rules stored in the function restriction rule storing unit, the conditions may be combined and the logical sum, logical product, or the like, of the conditions may be used as the reference. The number of conditions may be increased or decreased. Setting conditions for the vehicle state taking into consideration vehicle states that will certainly occur in a case where control of the object of function control in the function restricting rules is being executed in a normal manner enables a situation where normal data frames are erroneously invalidated to be prevented. Also, appropriately selecting the state of the vehicle serving as conditions of vehicle control, such as vehicle speed, gearshift position, and so forth, and setting conditions regarding the state of the vehicle in the function restricting rules, enables suppression of unauthorized control by control frames after an attacker has transmitted counterfeiting state frames regarding the state of the vehicle. For example, in the example of the onboard network system having the parking support function described in the first embodiment and the second embodiment, the timing at which control frames, including a control flag indicating control, regarding normal steering wheel control instructions start to be transmitted is after the driver has performed an operation to start executing of the parking support function. Now, the driver changes the gearshift position to "reverse" before performing an operation to start executing of the parking support function, and specifies a parting position while referencing the video of behind the vehicle displayed on the monitor. Accordingly, a state where the vehicle speed is 0 km/h at the timing of starting transmission of control frames relating to normal steering wheel control instruction, including a control frag indicating control, may be set as a condition of the vehicle state serving as a reference regarding the function restricting rules, for example. Also, in a case of using a system where the driver is requested to return the steering wheel to a straight state when the parking support function calculates the steering angle for the steering wheel, a state where the steering state of the steering wheel is generally straight at the timing of starting transmission of control frames relating to normal steering wheel control instruction, including a control frag indicating control, may be set as a condition of the vehicle state serving as a reference regarding the function restricting rules, for example. Also, the sequence of operations performed at the time of the driver using the parking support function may be taken into consideration, and the state where the vehicle speed is 0 km/h, the gearshift position is "reverse", the steering state of the steering wheel is generally straight, and so forth, having occurred in sequence by the timing of starting transmission of control frames relating to normal steering wheel control instruction, including a control frag indicating control, may be set as a condition of the vehicle state, for example.

(8) An example has been described above in the embodiments regarding counterfeit detection of the state of the vehicle, where, in a case of having received multiple state frames in a period within the range of a margin regarding transmission intervals that have been set beforehand, based on transmission intervals stipulated regarding state frames, determination is made that the state of the vehicle regarding those state frames has been counterfeited. However, the method of counterfeit detection regarding the state of the vehicle is not restricted to the method according to this example. For example, a threshold value for the number of data frames received within a certain period may be stipulated beforehand, and determination may be made that the state of the vehicle has been counterfeited in a case where the threshold value is exceeded. Also, a threshold value for the amount of change in values of data frames, or a threshold value of the number of times of change in value, within a certain period or within a certain number of times of reception, may be stipulated beforehand, and determination may be made that the state of the vehicle has been counterfeited in a case where the threshold value is exceeded. Determination may also be made that the state of the vehicle has been counterfeited from breakdown in relationship between data frames of different IDs. Determination may also be made that the state of the vehicle has been counterfeited by combining information that can be obtained from other than data frames flowing over the onboard network, such as Global Positioning System (GPS) information map information, information relating to the state of the ignition, information of various types of sensors, and so forth.

(9) Although an example where data frames flow over the bus in plaintext has been described in the above embodiments, these may be encrypted. Data frames may include a message authentication code.

(10) Although an example where the function restricting rules are stored in plaintext has been described in the above embodiments, these may be encrypted and stored.

(11) Although an example has been described in the above embodiments where the reception history information is referenced to calculate the amount of time of continuation of the state of the vehicle by the current time, as a method to calculate the vehicle state continuation time, but this method is not restrictive. For example, the amount of time of continuation of the state of the vehicle may be calculated by storing only the last time of reception of a state frame having a particular ID and the data value at that time. It is sufficient to be able to distinguish whether or not a predetermined amount of time has elapsed in accordance with the conditions of vehicle state continuation time in the function restricting rules, and the continuation time regarding the state of the vehicle does not necessarily have to be calculated. For example, whether or not conditions in the function restricting rules are satisfied may be distinguished by setting a timer when the state of the vehicle satisfies predetermined conditions in the function restricting rules, and distinguishing whether or not the timer is greater than a predetermined time. Also, whether or not conditions in the function restricting rules are satisfied may be distinguished by setting a countdown timer of a predetermined amount of time when the state of the vehicle satisfies predetermined conditions in the function restricting rules, and distinguishing whether or not the timer has reached 0.

(12) An example has been described in the above embodiments where control by control frames that are the object of function restriction is suppressed by the monitoring ECU since the state of the vehicle is deemed to be not a stable state only when time of a threshold value stipulated beforehand or more elapses for the vehicle state continuation time in the function restricting rules. However, control by a control frame does not necessarily have to be suppressed in a case where the state of the vehicle is not a stable state due to time of the threshold value stipulated beforehand or more not having elapsed for the vehicle state continuation time, and suppression may be performed in a case where a state that is not a stable state has continued for a certain while. This is useful in suppressing erroneous detection where normal control frames are erroneously invalidated, with regard to control frames relating to control where danger is low even if unauthorizedly transmitted.

(13) Although a time where both data frames including information of control instructions indicating controlled and data frames including information of control instructions indicating not controlled are observed in a predetermined period, has been described in the above embodiments as inconsistency continuation time, the method for measuring inconsistency continuation time is not restricted to this. For example, in a case where the amount of change of data values in multiple data frames including data values used for control that have been received in a certain period exceed a threshold value, an inconsistency may be deemed to be occurring, and the continuation time may be measured.

(14) Although examples such as vehicle speed, gearshift position, and so forth, have been given as examples in the above-described embodiments, states of the vehicle monitored by the monitoring ECU are not restricted to these. For example, states of the vehicle may be rotation speed of wheels, yaw rate, acceleration, steering angle, accelerator pedal angle, braking level, engine revolutions, electric motor revolutions, gearshift position, state of ignition switch, steering torque of steering wheel, whether or not there is an obstacle ahead, whether or not there is an obstacle behind, distance to obstacle ahead, distance to obstacle behind, state of recognition of pavement lane markings to the right and left, distance to pavement lane markings to the right and left, and so forth. The state of the vehicle is, for example, a state obtained by sensors.

(15) An example has been described in the above embodiments of control relating to the parking support function and cruise control function, as control that is the object of determination by the monitoring ECU regarding whether or not suppression should be made, but control based on control frames regarding which determination is made by the monitoring ECU whether to suppress or not is not restricted to the steering wheel control regarding the parking support function and control acceleration or deceleration regarding the cruise control function. For example, control regarding which determination is made by the monitoring ECU whether to suppress or not may be control relating to the collision avoidance braking system, adaptive cruise control system, lane departure warning system, or the like. Also, control regarding which determination is made by the monitoring ECU whether to suppress or not may be control relating to traveling of the vehicle. Control relating to traveling of the vehicle is any one of control relating to traveling (e.g., acceleration control), control relating to turning (e.g., steering control), and control relating to stopping (e.g., braking control). Control regarding which determination is made by the monitoring ECU whether to suppress or not may also be control that indirectly affects control relating to traveling of the vehicle, such as control of presenting information to the driver on an instrument panel or the like.

In a case of making control relating to the collision avoidance braking system to be an object of determination by the monitoring ECU whether to suppress or not, the monitoring ECU may use a state where distance to an obstacle ahead has been counterfeited as a condition for vehicle state in the function restricting rules, for example, and monitor the time of reception of state frames indicating distance to an obstacle ahead, data values, and so forth, to determine whether or not counterfeited. For example, the monitoring ECU may determine that counterfeiting has been performed in a case where a state that there is no obstacle ahead, or that an obstacle exists far away, changes to a state where an obstacle ahead is suddenly right in front. In a case where a control frame for control relating to the collision avoidance braking system appears on the bus in a counterfeited state, the monitoring ECU invalidates that control frame or the like.

In a case of making control relating to the adaptive cruise control system to be an object of determination by the monitoring ECU whether to suppress or not, the monitoring ECU may use a state where distance to a vehicle traveling ahead has been counterfeited as a condition for vehicle state in the function restricting rules, for example, and monitor the time of reception of state frames indicating distance to a vehicle traveling ahead, data values, and so forth, to determine whether or not counterfeited. For example, the monitoring ECU may determine that counterfeiting has been performed in a case where a state that there is no vehicle traveling ahead, or a state that a vehicle traveling ahead exists far away, changes to a state where a vehicle traveling ahead is suddenly right in front, or in a case where a state where a vehicle traveling ahead is right in front changes to a state that a vehicle traveling ahead exists far away, or a state that there is no vehicle traveling ahead.

In a case of making control relating to the lane departure warning system to be an object of determination by the monitoring ECU whether to suppress or not, the monitoring ECU may use a state where distance to pavement lane markings has been counterfeited as a condition for vehicle state in the function restricting rules, for example, and monitor the time of reception of state frames indicating distance to pavement lane markings to either the right or left of the lane in which the vehicle is traveling, data values, and so forth, to determine whether or not counterfeited. For example, the monitoring ECU may determine that counterfeiting has been performed in a case where a state that there are no pavement lane markings recognized, or that a there is sufficient distance to pavement lane markings, changes to a state where the distance to the pavement lane markings suddenly becomes short and the vehicle is bearing down on the pavement lane markings.

Figure 28:
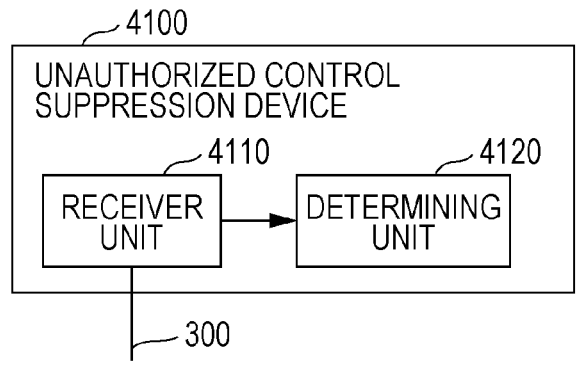
FIG. 28 is a diagram illustrating an example of the configuration of an unauthorized control suppression device according to another embodiment.

(16) Although an unauthorized control suppression device has been exemplified in the above embodiments by the monitoring ECUs 100, 2100, and 3100, the unauthorized control suppression device does not necessarily have to have all components of the monitoring ECUs described above. The unauthorized control suppression device may be configured as illustrated in FIG. 28. An unauthorized control suppression device 4100 illustrated in the FIG. 28 is connected to the bus 300 (see FIG. 1) where multiple ECUs exchange state frames that are frames including information relating to the state of the vehicle, and control frames that are frames indicating predetermined control (e.g., steering wheel control) to the vehicle, in an onboard network system relating to an onboard network following the CAN protocol. The unauthorized control suppression device 4100 is configured including a receiver 4110 and a determining unit 4120. The receiver 4110 sequentially receives state frames and control frames from the bus 300. The receiver 4110 is realized by, for example, a communication circuit such as a CAN controller or the like, a processor, memory, and so forth. The determining unit 4120 determines whether or not to suppress predetermined control based on a control frame received by the receiver 4110, based on whether or not the state of the vehicle within a predetermined period preceding reception of that control frame (e.g., 100 ms interval or the like), identified based on a set of state frames received by the receiver 4110 within that predetermined period, satisfies a predetermined reference (e.g., a reference indicated by the above-described function restricting rules or the like). The determining unit 4120 can identify the state of the vehicle within the predetermined period based on a set of state frames received by the receiver 4110 within the predetermined period, for example. Note that the state of the vehicle within the predetermined period may be identified from the contents of one type of state frame (e.g., state frames that have the same ID), or may be identified from the contents of multiple types of state frames (e.g., state frames that have IDs different from each other).

As for the predetermined reference used by the determining unit 4120 to perform determination, for example, a reference may be used that is satisfied in a case where the state of the vehicle is a counterfeited state in a predetermined period and not satisfied if not in a counterfeited state, or a reference may be used that is satisfied in a case where the state of the vehicle is not in a stable state in a predetermined period but not satisfied if in a stable state, or a reference may be used that is satisfied in a case where the state of the vehicle is a frequent-change-occurrence state and is not satisfied if not a frequent-change-occurrence state. In a case of using any of these references, the determining unit 4120 determines that predetermined control should be suppressed in a case where the predetermined reference is satisfied. On the opposite from these examples, a reference may be set where determination is made by the determining unit 4120 that predetermined control should be suppressed in a case where the predetermined reference is not satisfied. Note that the determining unit 4120 can identify that the state of the vehicle is a counterfeited state in a case where an abnormal state frame is included in a set of state frames received within a predetermined period, and identify that the state of the vehicle is not a counterfeited state if no abnormal state frames are included. In this case, the determining unit 4120 may distinguish whether or not an abnormal state frame is included in the set of state frames by any method. For example, in a case where multiple state frames that have the same ID (i.e., indicate information of the same item) that are used to execute predetermined control, and that have been received in a reception interval shorter than a predetermined threshold value, are included in a set of state frames received within a predetermined period, determination may be made that an abnormal state frame is included in that set. Also, in a case where the number of state frames having the same ID that are used to execute predetermined control included in a set of state frames received within a predetermined period is greater than a predetermined number, determination may be made that an abnormal state frame is included in that set. Also, in a case where two state frames having the same ID that are used to execute predetermined control are included in a set of state frames received within a predetermined period, and the difference between the values of information indicated by the two state frames is greater than a predetermined amount, determination may be made that an abnormal state frame is included in that set. Also, in a case where multiple state frames that have the same ID that are used to execute predetermined control are included in a set of state frames received within a predetermined period, and the values of information that the multiple state frames arrayed in the order of reception indicate do not follow a predetermined rule, determination may be made that an abnormal state frame is included in that set.

The determining unit 4120 is realized by, for example, a processor, timer, memory, and so forth. The determining unit 4120 can perform output in accordance with the determination results. In a case of having determined that predetermined control based on a control frame should be suppressed, the determining unit 4120 may transmit an error frame to the bus 300 so as to overwrite at least part of that control frame by the CAN controller or the like. The unauthorized control suppression device 4100 may also have transfer functions that undertake transferring of frames among multiple communication channels, for example, and in this case, the determining unit 4120 may, in a case of determining that predetermined control based on a control frame should be suppressed, exclude that control frame from the object of transfer, and not transfer that control frame.

Also, although an example has been described where an unauthorized control suppression device or monitoring ECU is installed in a vehicle and included in an onboard network system, these may be included in a network system for control of an object of control other than a vehicle. Examples of objects of control other than vehicles include robots, aircraft, ships, machines, and so forth.

(17) In the above-described embodiments, an onboard network that performs transmission of data frames such as state frame, control frames, and so forth, in accordance with the CAN protocol, has been illustrated. This CAN protocol is to be understood to have a broad meaning, encompassing derivative protocols such as CANOpen used in embedded systems within automation systems and so forth, Time-Triggered CAN (TTCAN), CAN with Flexible Data Rate (CANFD) and so forth. Also, protocols other than the CAN protocol may be used in the onboard network. Examples of onboard network protocols that transmit state frames which are frames including information relating to the state of the vehicle, and control frames that are frames instructing predetermined control to the vehicle, include Local Interconnect Network (LIN), Media Oriented Systems Transport (MOST, a registered trademark), FlexRay (registered trademark), Ethernet (registered trademark), and so forth. Further, networks using these protocols may be used as sub-networks, and sub-networks relating to multiple types of protocols may be combined to configure the onboard network. The Ethernet (registered trademark) protocol may be understood to have a broad meaning, encompassing derivative protocols such as Ethernet (registered trademark) AVB (Audio Video Bridging) relating to IEEE 802.1, Ethernet (registered trademark) TSN (Time Sensitive Networking) relating to IEEE 802.1, Ethernet (registered trademark)/IP (Industrial Protocol), (Ethernet (registered trademark) for Control Automation Technology (EtherCAT, a registered trademark), and so forth. Note that the communication channel of the onboard network may be a wired communication channel configured of a network bus (e.g., bus 300), other wires, optical fiber, or the like, or may be another communication channel.

(18) Part or all of the components configuring the devices in the above-described embodiments may be configured as a single system LSI (Large Scale Integration). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip. While description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used. Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(19) Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(20) One aspect of the present disclosure may be an unauthorized control suppression method including all or part of processing procedures illustrated in, for example, FIGS. 12, 19, and 27, and so forth. For example, the unauthorized control suppression method may be an unauthorized control suppression method in an onboard network system including multiple ECUs that exchange, via a communication channel (e.g., the bus 300), multiple frames, including control frames that instruct predetermined control (e.g., steering wheel control or the like) to a vehicle. The method includes a reception step (e.g., steps S31, S221, S321) of sequentially receiving multiple frames from the communication channel, and a determining step (e.g., steps S36, S224, S326) of determining whether or not the predetermined control based on the control frame received in the reception step should be suppressed, based on a set of frames received in the reception step, within a predetermined period preceding a time of reception of the control frame. The unauthorized control suppression method may include a processing step (e.g., steps S37, S225, S327) of executing predetermined processing to suppress predetermined control in a case of determination having been made in the determining step that predetermined control based on the control frame should be suppressed. The predetermined processing for suppressing the predetermined control based on the control frame is, for example, processing of discarding that control frame, processing of overwriting that control frame on the communication channel by transmitting an error frame or the like, processing of suppressing transfer of that control frame to another communication channel, processing of instructing an ECU not to execute predetermined control based on that control frame, or the like. An aspect of the present disclosure may be a program (computer program) which realizes this method by a computer, or may be digital signals made up of the computer program. An aspect of the present disclosure may be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums. An aspect of the present disclosure may be an arrangement where the computer program or the digital signals are transmitted over an electric communication line, wireless or cable communication line, a network of which the Internet is representative, data broadcasting, or the like. Also, an aspect of the present disclosure may be a computer system having a microprocessor and memory, where the memory records the computer program, and the microprocessor operates according to the computer program. The program or the digital signals may be recorded in the recording medium and transported, or the program or the digital signals may be transported over the network or the like, and thereby be executed by another computer system that is independent.

(21) Forms realized by optionally combining the components and functions described in the above embodiments and the above modifications are also included in the scope of the present disclosure.

The present disclosure is applicable to an onboard network system including an onboard network.

What is claimed is:

1. A method in a network system, the network system including a plurality of electronic controllers that transmits and receives, via a network, a plurality of frames, the method comprising:

receiving, sequentially, the plurality of frames from the network, the plurality of frames including a control frame that instructs predetermined control to an object of control; and determining whether the predetermined control, instructed by the control frame received in the receiving, is to be suppressed, based on a set of frames received in the receiving, the set of frames being included in the plurality of frames, wherein the set of frames is received in the receiving within a predetermined period preceding a time of reception of the control frame.

2. The method according to claim 1, wherein the plurality of frames further includes at least one state frame that includes information relating to a state of the object of control, in the determining, whether the predetermined control is to be suppressed is determined based on whether the state of the object of control, within the predetermined period, satisfies a predetermined condition, the state of the object of control being identified based on the state frame, and the state frame is received in the receiving within the predetermined period preceding the time of reception of the control frame.

3. The method according to claim 2, wherein, in the determining, the state of the object of control is identified as being a counterfeited state in a case where the state frame includes an abnormal state frame, in the determining, the state of the object of control is identified as not being the counterfeited state in a case where the state frame does not include the abnormal state frame, the predetermined condition is satisfied when the state of the object of control is identified as being the counterfeited state, and the predetermined condition is not satisfied when the state of the object of control is identified as not being the counterfeited state.

4. The method according to claim 3, wherein, in the determining, the state of the object of control is identified as being the counterfeited state in a case where a plurality of state frames received in the receiving within the predetermined period is received at a reception interval shorter than a predetermined threshold value, the plurality of state frames each indicating information of a same item to be used for execution of the predetermined control, the plurality of state frames being received at the reception interval shorter than the predetermined threshold value due to the abnormal state frame being included in the plurality of state frames.

5. The method according to claim 3, wherein, in the determining, the state of the object of control is identified as being the counterfeited state in a case where a number of state frames received in the receiving within the predetermined period is greater than a predetermined number, each of the state frames indicating information of a same item to be used for execution of the predetermined control, the number of state frames being greater than the predetermined number due to the abnormal state frame being included in the number of state frames.

6. The method according to claim 3,
wherein, in the determining, the state of the object of control is identified as being the counterfeited state in a case where a difference between values of information of two state frames received in the receiving within the predetermined period is greater than a predetermined amount, the two state frames each indicating the information of a same item to be used for execution of the predetermined control, the difference between the values being greater than the predetermined amount due to the abnormal state frame being included in the two state frames.

7. The method according to claim 3,
wherein, in the determining, the state of the object of control is identified as being the counterfeited state in a case where an order of reception of values of information arrayed in a plurality of state frames received in the receiving within the predetermined period do not follow a predetermined rule, the plurality of state frames each indicating the information of a same item to be used for execution of the predetermined control, the order of reception of the values of the information arrayed in the plurality of state frames not following the predetermined rule due to the abnormal state frame being included in the plurality of state frames.

8. The method according to claim 2,
wherein, in the determining, the predetermined condition is satisfied in a case where the state of the object of control in the predetermined period is not a stable state,
in the determining, the predetermined condition is not satisfied in a case where the state of the object of control in the predetermined period is a stable state,
the stable state is a state where a data value of a particular state frame indicating the state of the object of control is a state of being a certain value or within a certain range, and
the state frame is received in the receiving within the predetermined period immediately preceding and consecutive to the time of reception of the control frame.

9. The method according to claim 2,
wherein, in the determining, the predetermined condition is satisfied in a case where the state of the object of control in the predetermined period is a frequent-change-occurrence state where change occurs more than a predetermined number of times, and
in the determining, the predetermined condition is not satisfied in a case where the state of the object of control in the predetermined period is not the frequent-change-occurrence state.

10. The method according to claim 1, further comprising:
executing predetermined processing for suppressing the predetermined control, in a case where a determination is made in the determining that the predetermined control based on the control frame is to be suppressed,
wherein the predetermined processing includes any one of
processing of discarding the control frame,
processing of overwriting the control frame on the network,
processing of suppressing transfer of the control frame to another network, and
processing of instructing the plurality of electronic controllers to not execute the predetermined control based on the control frame.

11. The method according to claim 1,
wherein the object of control is a mobility entity which includes the network system,
the network is a wired in the mobility entity, and
the plurality of electronic controllers transmits and receives the plurality of frames following a CAN protocol or Ethernet protocol.

12. The method according to claim 11,
wherein the predetermined control relates to traveling of the mobility entity.

13. The method according to claim 11,
wherein, in the receiving, sequential reception is performed of state frames that include any one of mobility entity speed, rotation speed of wheels, yaw rate, acceleration, steering angle, accelerator pedal angle, braking level, engine revolutions, electric motor revolutions, gearshift position, and state of ignition switch.

14. The method according to claim 11, further comprising:
transmitting an error frame,
wherein the plurality of frames further include a state frame including information relating to a state of the object of control,
the plurality of electronic controllers is connected to the network, and transmits and receives state frames and control frames that are data frames, according to the CAN protocol, and
in a case that the predetermined control is determined to be suppressed, the error frame is transmitted to the network bus in the transmitting, to overwrite at least part of the control frame.

15. The method according to claim 1,
wherein the set of frames includes a frame different in type from the control frame.

16. A device, connected to a network over which a plurality of electronic controllers transmits and receives a plurality of frames, the device comprising:
a receiver that sequentially receives the plurality of frames from the network, the plurality of frames including a control frame that instructs an object of control to perform predetermined control; and
circuitry that, in operation, performs operations including determining whether the predetermined control, instructed by the control frame received by the receiver, is to be suppressed, based on a set of frames received by the receiver, the set of frames being included in the plurality of frames,
wherein the set of frames is received by the receiver within a predetermined period preceding a time of reception of the control frame.

17. The device according to claim 16,
wherein the set of frames includes a frame different in type from the control frame.

18. A network system including a plurality of electronic controllers that transmits and receives frames, via a network bus, the network system comprising:
a receiver that sequentially receives the frames from the network bus, the frames including state frames and a control frame, the state frames including information relating to states of a mobility entity, the control frame instructing the mobility entity to perform predetermined control; and circuitry that, in operation, performs operations including
determining whether the predetermined control, instructed by the control frame received by the receiver, is to be suppressed, based on whether a state of the mobility entity in a predetermined period preceding a time of reception of the control frame satisfies a predetermined condition,
wherein the state of the mobility entity is identified in the predetermined period preceding the time of reception of the control frame based on a set of the state frames received by the receiver within the predetermined period preceding the time of reception of the control frame.

* * * * *